(12) United States Patent
Ji et al.

(10) Patent No.: US 11,817,928 B2
(45) Date of Patent: Nov. 14, 2023

(54) METHOD AND APPARATUS FOR CHANNEL ESTIMATION FOR OFDM BASED SINGLE CARRIER SYSTEM

(71) Applicant: Samsung Electronics Co., Ltd., Suwon-si (KR)

(72) Inventors: Hyoungju Ji, Suwon-si (KR); Juho Lee, Suwon-si (KR); Younsun Kim, Suwon-si (KR); Hoondong Noh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/083,853

(22) Filed: Oct. 29, 2020

(65) Prior Publication Data

US 2021/0126688 A1    Apr. 29, 2021

(30) Foreign Application Priority Data

Oct. 29, 2019    (KR) .................. 10-2019-0135729

(51) Int. Cl.
    *H04B 7/06*    (2006.01)
    *H04L 5/00*    (2006.01)
    *H04L 25/02*   (2006.01)

(52) U.S. Cl.
    CPC ......... *H04B 7/0626* (2013.01); *H04L 5/0092* (2013.01); *H04L 25/022* (2013.01); *H04L 25/0212* (2013.01)

(58) Field of Classification Search
    CPC . H04B 7/0626; H04L 5/0092; H04L 25/0212; H04L 25/022
    See application file for complete search history.

(56) References Cited

U.S. PATENT DOCUMENTS 9,628,231 B2    4/2017  Shattil
9,661,658 B2    5/2017  Li et al.
                        (Continued)

FOREIGN PATENT DOCUMENTS

JP    2013-046131 A     3/2013
SG    10201704271 A1    6/2017
                        (Continued)

OTHER PUBLICATIONS

3rd Generation Partnership Project; Technical Specification Group Radio Access Network; Evolved Universal Terrestrial Radio Access (E-UTRA); Physical layer procedures (Release 15), 3GPP TS 36.213 V15.7.0, Sep. 28, 2019, section 7.2.

(Continued)

*Primary Examiner* — Natasha W Cosme
(74) *Attorney, Agent, or Firm* — Jefferson IP Law, LLP

(57) ABSTRACT

The disclosure relates to a communication technique that converges a 5G communication system to support a higher data rate after a $4^{th}$ Generation (4G) system with Internet of Things (IoT) technology, and a system thereof. The disclosure can be applied to intelligent services (e.g., smart home, smart building, smart city, smart car or connected car, healthcare, digital education, retail, security and safety related services, or the like) based on $5^{th}$ Generation (5G) communication technology and IoT related technology. In addition, the disclosure provides a method and an apparatus for reducing user equipment (UE) power consumption in a wireless communication system.

12 Claims, 15 Drawing Sheets

(56) References Cited

U.S. PATENT DOCUMENTS

| | | |
|---|---|---|
| 2015/0327284 A1 | 11/2015 | Wakabayashi |
| 2017/0150388 A1 | 5/2017 | Wen et al. |
| 2018/0092087 A1 | 3/2018 | Zirwas et al. |
| 2018/0183650 A1* | 6/2018 | Zhang ..................... H04B 1/38 |
| 2019/0199492 A1 | 6/2019 | Na et al. |
| 2020/0128547 A1* | 4/2020 | Shi ........................ H04B 17/00 |
| 2020/0178241 A1 | 6/2020 | Wu et al. |
| 2020/0221325 A1 | 7/2020 | Zheng et al. |
| 2021/0195632 A1* | 6/2021 | Jungnickel ........... H04B 10/116 |

FOREIGN PATENT DOCUMENTS

| | | |
|---|---|---|
| WO | 2018/228425 A1 | 12/2018 |
| WO | 2019/057073 A1 | 3/2019 |

OTHER PUBLICATIONS

International Search Report dated Jan. 29, 2021, issued in International Application No. PCT/KR2020/014898.
Extended European Search Report dated Sep. 7, 2022, issued in European Patent Application No. 20883145.3.
Indian Office Action dated Sep. 15, 2022, issued in Indian Patent Application No. 202237023481.
3GPP TS 38.214 V15.7.0, 3rd Generation Partnership Project; Technical Specification Group Radio Access Network; NR; Physical layer procedures for data, (Release 15), Sep. 28, 2019.
Korean Office Action dated Sep. 13, 2023, issued in Korean Patent Application No. 10-2019-0135729.

* cited by examiner

METHOD AND APPARATUS FOR CHANNEL ESTIMATION FOR OFDM BASED SINGLE CARRIER SYSTEM

CROSS-REFERENCE TO RELATED APPLICATION(S)

This application is based on and claims priority under 35 U.S.C. § 119(a) of a Korean patent application number 10-2019-0135729, filed on Oct. 29, 2019, in the Korean Intellectual Property Office, the disclosure of which is incorporated by reference herein in its entirety.

BACKGROUND

1. Field

The disclosure relates to a channel estimation method and an apparatus for an OFDM-based single carrier system.

2. Description of Related Art

To meet the demand for wireless data traffic having increased since deployment of $4^{th}$ Generation (4G) communication systems, efforts have been made to develop an improved $5^{th}$ Generation (5G) or pre-5G communication system. Therefore, the 5G or pre-5G communication system is also called a 'Beyond 4G Network' or a 'Post long term evolution (LTE) System'. The 5G communication system is considered to be implemented in higher frequency millimeter Wave (mmWave) bands, e.g., 60 gigahertz (GHz) bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated Multi-Points (CoMP), reception-end interference cancellation and the like. In the 5G system, hybrid frequency shift keying (FSK) and quadrature amplitude modulation (QAM) frequency quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies, such as a sensor network, machine type communication (MTC), and machine-to-machine (M2M) communication may be implemented by beamforming, MIMO, and array antennas. Application of a cloud radio access network (RAN) as the above-described Big Data processing technology may also be considered to be as an example of convergence between the 5G technology and the IoT technology.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a channel estimation method and apparatus that can be processed on a time domain.

Another aspect of the disclosure is to provide a channel estimation method that can be performed through processing on a time-domain without a fast fourier transform (FFT) operation.

Another aspect of the disclosure is to provide a method of estimating a channel of the entire frequency band using a channel state information-reference signal (CSI-RS) transmitted through a partial band of the entire frequency band is disclosed.

Additional aspects will be set forth in part in the description which follows and, in part, will be apparent from the description, or may be learned by practice of the presented embodiments.

In accordance with an aspect of the disclosure, a method performed by a terminal is provided. The method includes receiving, from a base station, information on a first channel state information (CSI) resource corresponding to a first frequency band and information on a second CSI resource corresponding to a second frequency band, receiving, from the base station, a CSI related signal on the first CSI resource corresponding to the first frequency band, obtaining at least one of CSI for the first frequency band or CSI for the second frequency band based on the CSI related signal received on the first CSI resource, and transmitting, to the base station, at least one of the CSI for the first frequency band or the CSI for the second frequency band.

In accordance with another aspect of the disclosure, a method performed by a base station is provided. The method includes transmitting, to a terminal, information on a first CSI resource corresponding to a first frequency band and information on a second CSI resource corresponding to a second frequency band, transmitting, to the terminal, a CSI related signal on the first CSI resource corresponding to the first frequency band, and receiving, from the terminal, at least one of CSI for the first frequency band or CSI for the second frequency band, wherein at least one of the CSI for the first frequency band or the CSI for the second frequency band is obtained based on the CSI related signal transmitted on the first CSI resource.

In accordance with another aspect of the disclosure, a terminal is provided. The terminal includes a transceiver, and at least one processor configured to receive, from a base station, information on a first CSI resource corresponding to a first frequency band and information on a second CSI resource corresponding to a second frequency band, receive, from the base station, a CSI related signal on the first CSI resource corresponding to the first frequency band, obtain at least one of CSI for the first frequency band or CSI for the second frequency band based on the CSI related signal received on the first CSI resource, and transmit, to the base station, at least one of the CSI for the first frequency band or the CSI for the second frequency band.

In accordance with another aspect of the disclosure, a base station is provided. The base station includes a transceiver, and at least one processor configured to transmit, to a terminal, information on a first CSI resource corresponding to a first frequency band and information on a second CSI resource corresponding to a second frequency band, transmit, to the terminal, a CSI related signal on the first CSI resource corresponding to the first frequency band, and receive, from the terminal, at least one of CSI for the first frequency band or CSI for the second frequency band, wherein at least one of the CSI for the first frequency band or the CSI for the second frequency band is obtained based on the CSI related signal transmitted on the first CSI resource.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
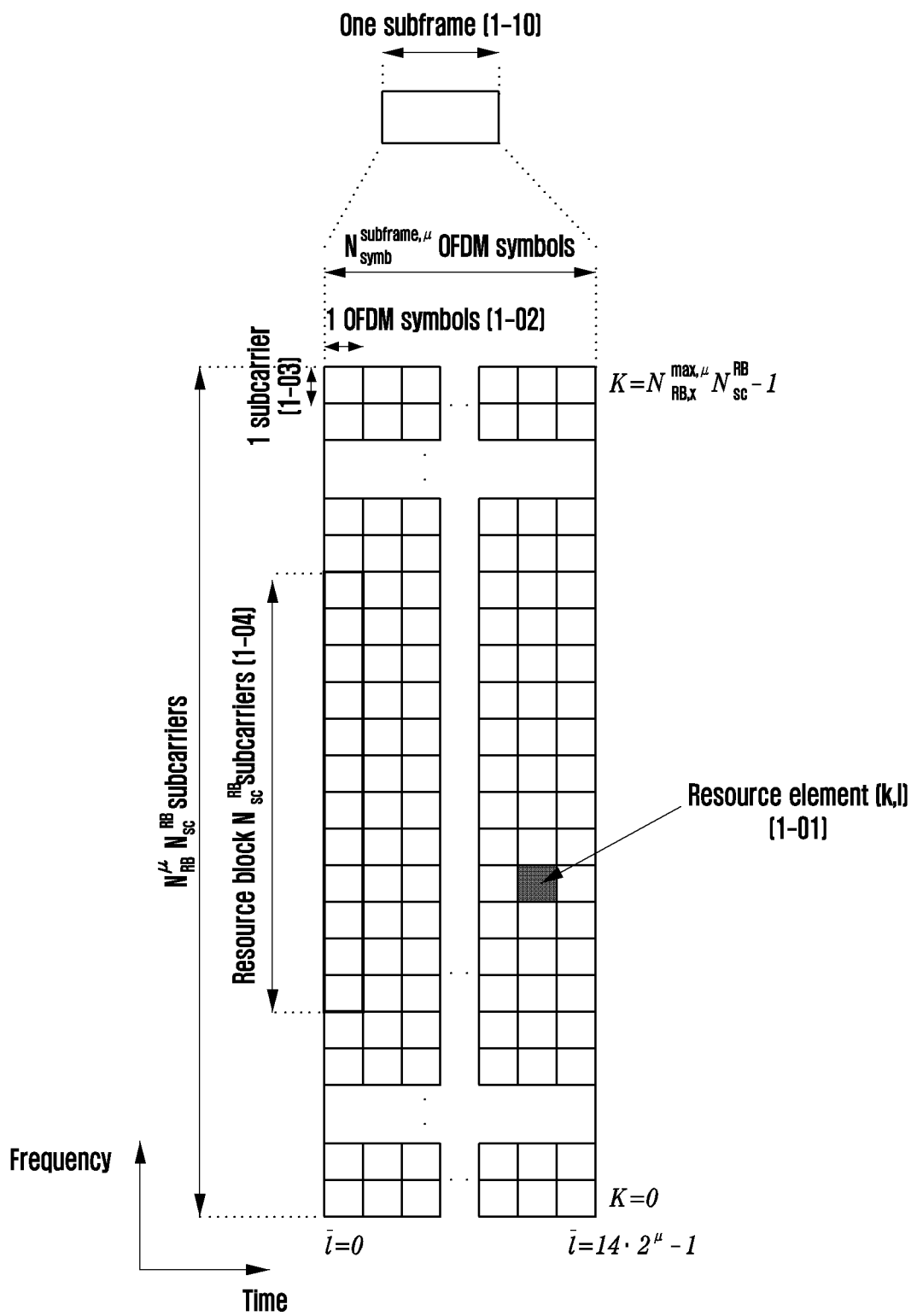
FIG. 1 is a diagram illustrating a basic structure of a time-frequency domain, which is a radio resource domain through which data or a control channel is transmitted in a $5^{th}$ generation (5G) system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing the embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making a reference to embodiments as described below in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that execute on the computer or other programmable apparatus provide operations for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a field programmable gate array (FPGA) or an application specific integrated circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card.

Hereinafter, the operation principle of the disclosure will be described in conjunction with the accompanying drawings. In the following description of the disclosure, a detailed description of known functions or configurations incorporated herein will be omitted when it may make the subject matter of the disclosure rather unclear. The terms which will be described below are terms defined based on the functions in the disclosure, and may be different according to users, intentions of the users, or customs. Therefore, the definitions of the terms should be made based on the contents throughout the specification. In the following description, a base station is an entity that allocates resources to terminals, and may be at least one of a gNode B, an eNode B, a Node B, a base station (BS), a wireless access unit, a base station controller, and a node on a network. A terminal may include a user equipment (UE), a mobile station (MS), a cellular phone, a smartphone, a computer, or a multimedia system capable of performing communication functions. Of course, examples of the base station and the terminal are not limited thereto. Hereinafter, in the disclosure, a description will be given of technologies for receiving broadcast information from a base station by a terminal in a wireless communication system. The disclosure relates to a technique for converging an Internet of Things (IoT) technology with a 5th generation communication system for supporting a higher data transfer rate beyond the 4th generation communication system, and a system therefor. The disclosure may be applied to intelligent services (e.g., smart homes, smart buildings, smart cities, smart cars or connected cars, healthcare, digital education, retail business, security and safety-related services, or the like) based on 5G communication technologies and IoT-related technologies.

In the following description, terms referring to broadcast information, terms referring to control information, terms associated with communication coverage, terms referring to status changes (e.g., event), terms referring to network entities, terms referring to messages, terms referring to device elements, and the like are illustratively used for the sake of convenience. Therefore, the disclosure is not limited by the terms as used below, and other terms referring to subjects having equivalent technical meanings may be used.

In the following description, the disclosure will be described using terms and names defined in the $3^{rd}$ generation partnership project long term evolution (3GPP LTE) standards, the latest existing communication standards, for the convenience of description. However, the disclosure is not limited by these terms and names, and may be applied in the same way to systems that conform other standards.

A wireless communication system has developed to be a broadband wireless communication system that provides a high speed and high quality packet data service, like the communication standards, for example, high speed packet access (HSPA) of 3GPP, long term evolution (LTE) or evolved universal terrestrial radio access (E-UTRA), LTE-advanced (LTE-A), high rate packet data (HRPD) of 3GPP2, ultra mobile broadband (UMB), and 802.16e of Institute of Electrical and Electronics Engineers (IEEE), or the like, beyond the voice-based service provided at the initial stage.

An LTE system, which is a representative example of the broadband wireless communication system, employs an orthogonal frequency division multiplexing (OFDM) scheme for a downlink (DL), and employs a single carrier frequency division multiple access (SC-FDMA) scheme for an uplink (UL). An uplink indicates a wireless link via which a user equipment (UE) or a mobile station (MS) transmits data or a control signal to an eNB (eNode B or base station). A downlink indicates a wireless link via which an eNB transmits data or a control signal to a UE. In the multiple access schemes as described above, time-frequency resources for carrying data or control information are allocated and operated in a manner to prevent overlapping of the resources, i.e., to establish the orthogonality, between users, so as to identify data or control information of each user.

A future communication system after LTE, that is, a 5G communication system, needs to freely apply various requirements from users, service providers, and the like, and thus, a service that satisfies various requirements in parallel needs to be supported. Services considered for the 5G communication system may include an enhanced mobile broadband (eMBB), massive machine type communication (mMTC), ultra reliability low latency communication (URLLC), and the like.

According to an embodiment of the disclosure, eMBB aims at providing a data transmission rate more enhanced than a data transmission rate supported by legacy LTE, LTE-A, or LTE-pro. For example, in the 5G communication system, eMBB needs to provide a maximum transmission rate (peak data rate) of 20 gigabits per second (Gbps) in a downlink, and a maximum transmission rate (peak data rate) of 10 Gbps in an uplink, from the perspective of a single eNB. In addition, the 5G communication system needs to provide an enhanced user perceived data rate of a UE, in parallel with providing a maximum transmission rate. In order to satisfy the requirements, there is a desire for improvement of transmission or reception technologies including an advanced multi input multi output (MIMO) transmission technology. In addition, the 5G communication system uses a frequency bandwidth wider than 20 MHz in a frequency band ranging from 3 to 6 GHz or 6 GHz or higher in a frequency band greater than or equal to 6 GHz, and thus, the data transmission rate required by the 5G communication system may be satisfied.

In addition, the 5G communication system considers mMTC in order to support application services, such as the Internet of Things (IoT). mMTC requires supporting access of a large number of UEs within a cell, improvement of coverage of a UE, enhanced battery life expectancy, reduction of cost of a UE, and the like, in order to effectively provide IoT. IoT provides a communication function via attachment to various sensors and various devices and thus, a large number of UEs needs to be supported within a cell (e.g., 1,000,000 UEs/km$^2$). In addition, a UE that supports mMTC has a high probability of being located in a shadow area that a cell cannot cover, such as the basement of a building, in terms of the feature of the service, and may require coverage wider than those of other services of the 5G communication system. The UE that supports mMTC needs to be manufactured as an inexpensive UE, and the battery of the UE may not be changed frequently. Accordingly, a long battery lifetime may be required.

Finally, URLLC is a cellular-based wireless communication service which is used for mission critical communication. For example, URLLC may include a remote control service for a robot or machinery, an industrial automation service, an unmanned aerial vehicle service, a remote heath care service, an emergency alert service, and the like. Therefore, communication provided by the URLLC may need to provide significantly low latency and significantly high reliability. For example, the service that supports URLLC needs to satisfy an air interface latency of less than 0.5 milliseconds, and at the same time, needs to satisfy a packet error rate of less than or equal to 10$^{-5}$. Therefore, for the service that supports URLLC, a 5G system needs to provide a transmit time interval (TTI) smaller than those of other services, and in parallel, is required to allocate a wide resource in a frequency band. However, the aforementioned mMTC, URLLC, and eMBB are only examples of different service types, and the service types to which the disclosure is applied are not limited to the above-described example.

The services considered in the 5G communication system described above should be provided by fusion with each other based on one framework. For example, for efficient resource management and control, it is preferable that each service is integrated into one system, controlled and transmitted rather than independently operated.

In addition, an embodiment of the disclosure will be described below using an LTE, LTE-A, LTE Pro, or NR system as an example, but the embodiment of the disclosure may be applied to other communication systems having a similar technical background or channel type. In addition, the embodiments of the disclosure may be applied to other communication systems through some modifications without significantly departing from the scope of the disclosure, as determined by a person having skilled technical knowledge.

The disclosure relates to a method and an apparatus for transmitting data and control signals between a plurality of transmission nodes and a UE which perform cooperative communication in order to improve communication reliability.

According to an embodiment of the disclosure, when network cooperative communication is used in a wireless communication system, a UE may improve the reliability of transmitted or received data/control signals through repeated transmission between transmission points. Alternatively, the UE may improve the transmission capacity of transmitted or received data/control signals through individual (independent) transmission for each transmission point.

Hereinafter, a frame structure of a 5G system will be described with reference to the drawings.

FIG. 1 is a diagram illustrating a basic structure of a time-frequency domain, which is a radio resource domain through which data or a control channel is transmitted in a 5G system according to an embodiment of the disclosure.

The structure of the time-frequency domain shown in FIG. 1 can be applied to LTE, LTE-A, NR, or a wireless communication system similar thereto.

Referring to FIG. 1, in a structure of a subframe 1-10, the horizontal axis represents a time domain and the vertical axis represents a frequency domain. The basic unit of a resource in the time and frequency domains is a resource element (RE) 1-01, and may be defined as one orthogonal frequency division multiplexing (OFDM) symbol 1-02 on the time domain and one subcarrier 1-03 on the frequency domain. In the RB frequency domain, $N_{sc}^{RB}$ (for example, 12) consecutive REs may constitute one resource block (RB) 1-04.

Figure 2:
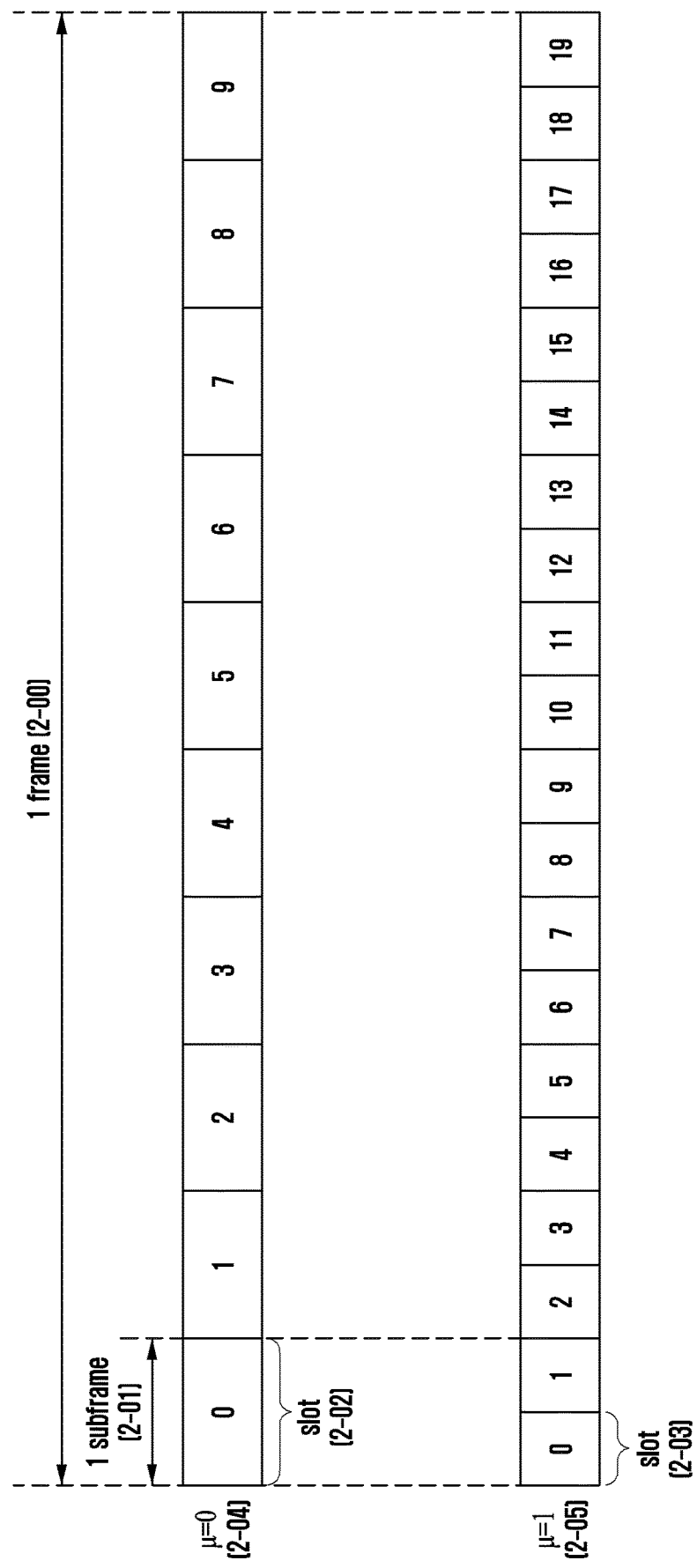
FIG. 2 is a diagram illustrating a structure of a frame, a subframe, and a slot in a 5G system according to an embodiment of the disclosure.

FIG. 2 is a diagram illustrating a structure of a frame, a subframe, and a slot in a 5G system according to an embodiment of the disclosure.

Referring to FIG. 2, an example of the structure of a frame 2-00, a subframe 2-01, and a slot 2-02 is illustrated. One frame 2-00 may be defined as 10 ms. One subframe 2-01 may be defined as 1 ms, and one frame 2-00 may be composed of a total of 10 subframes 2-01. One slot 2-02 or 2-03 may be defined as 14 OFDM symbols (that is, the number of symbols per slot $N_{slot}^{symb}=14$). One subframe 2-01 may be composed of one or a plurality of slots 2-02 and 2-03, and the number of slots 2-02 and 2-03 per subframe 2-01 may vary according to a configuration value μ 2-04 or 2-05 for a subcarrier spacing.

In the example of FIG. 2, a case of μ=0 (2-04) and a case of μ=1 (2-05) as the subcarrier spacing configuration value are illustrated. When μ=0 (2-04), one subframe 2-01 may be composed of one slot 2-02, and when μ=1 (2-05), one subframe 2-01 may be composed of two slots 2-03. For example, the number of slots per subframe $N_{slot}^{subframe\mu}$ may vary according to the configuration value μ for the subcarrier spacing, so that the number of slots per frame $N_{slot}^{frame\mu}$ may vary. According to each subcarrier spacing configuration μ, $N_{slot}^{subframe\mu}$ and $N_{slot}^{frame\mu}$ may be defined as shown in Table 1 below.

TABLE 1

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In NR, one component carrier (CC) or serving cell may be composed of up to 250 or more RBs. Therefore, when a UE always receives the entire serving cell bandwidth as in LTE, the power consumption of the UE may be extreme, and in order to solve this, a base station may configure one or more bandwidth parts (BWPs) with respect to the UE to support the UE so that the UE can change a reception area within a cell.

In NR, the base station may configure an 'initial BWP', which is the bandwidth of CORESET #0 (or common search space {CSS}), with respect to the UE through an MIB. Thereafter, the base station may configure an initial BWP (first BWP) of the UE through radio resource control (RRC) signaling, and may notify of at least one or more pieces of indicatable BWP configuration information, through downlink control information (DCI) in the future. Thereafter, the base station can indicate which band the UE will use by notifying of a BWP ID through the DCI. If the UE does not receive the DCI in a currently allocated BWP for more than a specific time, the UE returns to a 'default BWP' and attempts DCI reception.

Figure 3:
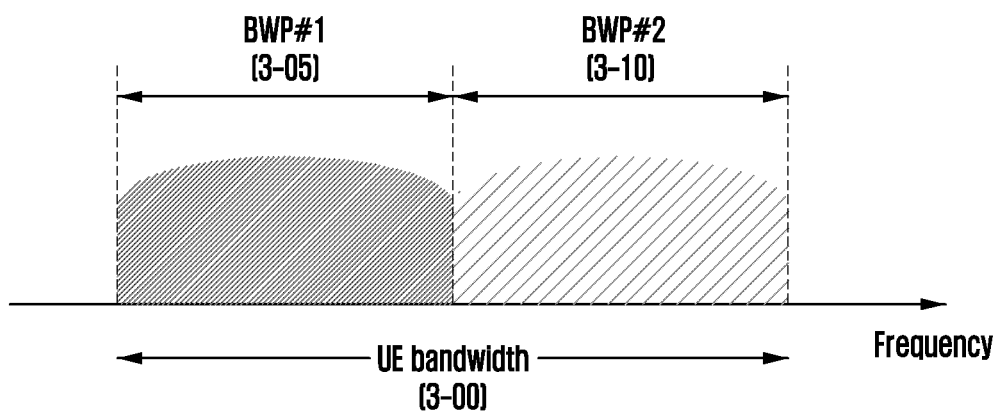
FIG. 3 is a diagram illustrating a configuration of a bandwidth part in a wireless communication system according to an embodiment of the disclosure.

FIG. 3 is a diagram illustrating a configuration of a bandwidth part in a wireless communication system according to an embodiment of the disclosure.

Referring to FIG. 3, a UE bandwidth 3-00 may include two bandwidth parts, namely, a bandwidth part #1 (3-05) and a bandwidth part #2 (3-10). A base station may configure one or a plurality of bandwidth parts with respect to a UE, and may configure information as shown in Table 2 below for each bandwidth part.

TABLE 2

| Configuration information 1 | Bandwidth of bandwidth part (number of PRBs constituting bandwidth part) |
|---|---|
| Configuration information 2 | Frequency position of bandwidth part (offset value compared to a reference point as this information, wherein there may be, for example, center frequency of carrier, synchronization signal, synchronization signal raster, or the like, as reference point) |
| Configuration information 3 | Numerology of bandwidth part (e.g., subcarrier spacing, cyclic prefix (CP) length, or the like) |
| Others | |

In addition to the configuration information described in Table 2, various parameters related to the bandwidth part may be configured with respect to the UE. The above-described information may be transmitted from the base station to the UE through higher layer signaling, for example, RRC signaling. At least one bandwidth part among the configured one or plurality of bandwidth parts may be activated. Whether the configured bandwidth part is activated may be transmitted from the base station to the UE in a semi-static manner through RRC signaling, or may be dynamically transmitted through a MAC control element (CE) or a DCI.

The configuration of the bandwidth part supported by the above-described 5G communication system can be used for various purposes.

For example, when the bandwidth supported by the UE is smaller than the system bandwidth, the bandwidth supported by the UE may be supported through the configuration of the bandwidth part. For example, in Table 2, the frequency position (configuration information 2) of the bandwidth part is configured with respect to the UE, whereby the UE can transmit and receive data at a specific frequency position within the system bandwidth.

As another example, for the purpose of supporting different numerologies, the base station may configure a plurality of bandwidth parts with respect to the UE. For example, in order to support both data transmission and reception using a subcarrier spacing of 15 kHz and a subcarrier spacing of 30 kHz to an arbitrary UE, two bandwidth parts may be configured to use the subcarrier spacings of 15 kHz and 30 kHz, respectively. Different bandwidth parts may be subjected to frequency division multiplexing (FDM), and when data is to be transmitted/received at a specific subcarrier spacing, a bandwidth part configured at the corresponding subcarrier spacing may be activated.

As another example, for the purpose of reducing the power consumption of the UE, the base station may configure bandwidth parts having different sizes of bandwidths with respect to the UE. For example, if the UE supports a significantly large bandwidth, such as 100 MHz and always transmits/receives data through the corresponding bandwidth, significantly large power consumption may occur. More particularly, it is significantly inefficient in terms of power consumption for the UE to monitor an unnecessary downlink control channel for the large bandwidth of 100 MHz in a situation where there is no traffic. Therefore, for the purpose of reducing the power consumption of the UE, the base station may configure a bandwidth part of a relatively small bandwidth, for example, a bandwidth part of 20 MHz with respect to the UE. In the situation where there is no traffic, the UE may perform a monitoring operation in the bandwidth part of 20 MHz, and when data is generated, the data may be transmitted and received using the bandwidth part of 100 MHz according to the instruction of the base station.

Figure 4:
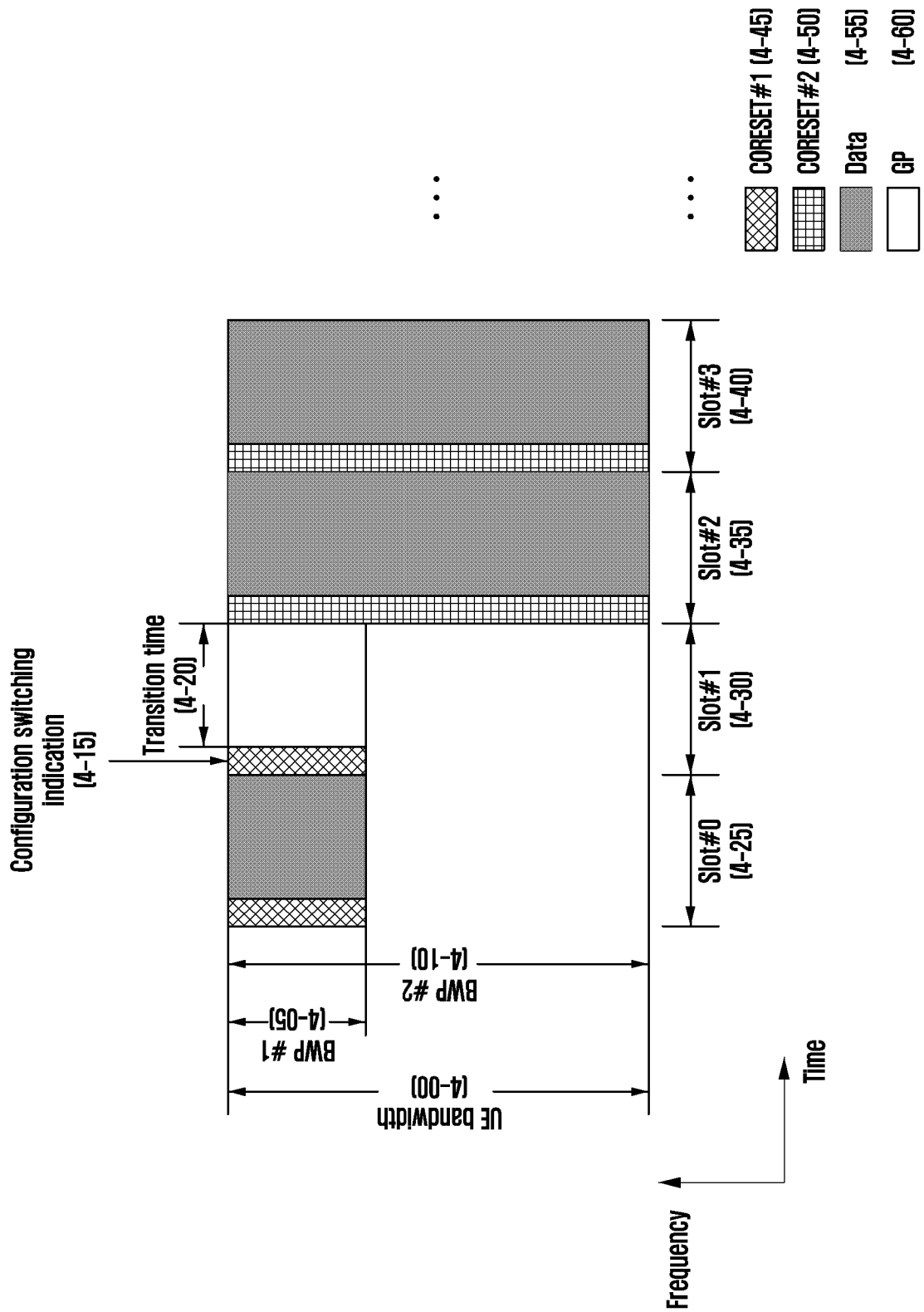
FIG. 4 is a diagram illustrating a method of changing a dynamic configuration for a bandwidth part according to an embodiment of the disclosure.

FIG. 4 is a diagram illustrating a method of changing a dynamic configuration for a bandwidth part according to an embodiment of the disclosure.

Referring to FIG. 4, as described in the above Table 2, a base station may configure one or a plurality of bandwidth parts with respect to a UE. By configuring each bandwidth part, information about the bandwidth of the bandwidth part, the frequency position of the bandwidth part, and the numerology of the bandwidth part may be informed of to the UE. As shown in FIG. 4, two bandwidth parts within a UE bandwidth 4-00, namely, bandwidth part #1 (BPW #1) (4-05) and bandwidth part #2 (BWP #2) (4-10) may be configured with respect to the UE. One or a plurality of bandwidth parts among the configured bandwidths may be activated, and in FIG. 4, an example in which one bandwidth part is activated may be considered. In slot #0 (4-25), bandwidth part #1 (4-02) among the configured bandwidth parts is activated, and the UE can monitor a physical downlink control channel (PDCCH) in CORESET #1 (4-45) and CORESET #2 (4-50) configured in bandwidth part #1 (4-05) and may transmit and receive data 4-55 in bandwidth part #1 (4-05). The CORESET in which the UE receives the PDCCH may be different depending on which of the configured bandwidth parts is activated, and accordingly, the bandwidth at which the UE monitors the PDCCH may vary.

The base station may additionally transmit an indicator for switching the configuration of the bandwidth part to the UE. Here, switching the configuration of the bandwidth part may be regarded as the same as an operation of activating a specific bandwidth part (e.g., switching the activation from bandwidth part A to bandwidth portion B). The base station may transmit a configuration switching indicator (indication) to the UE in a specific slot. The UE may determine a bandwidth part to be activated by applying the switched configuration according to the configuration switching indicator from a specific point in time after receiving the configuration switching indicator from the base station. In addition, the UE may perform monitoring on the PDCCH in the CORESET configured in the activated bandwidth part.

Referring to FIG. 4, the base station may transmit a configuration switching indicator 4-15 that instructs the UE to switch the activated bandwidth part from the existing bandwidth part #1 (4-05) to bandwidth part #2 (4-10), to the UE at slot #1 (4-30). After receiving the corresponding indicator, the UE may activate bandwidth part #2 (4-10) according to the content of the indicator. In this case, a transition time 4-20 for switching the bandwidth part may be required, so that a point in time at which the activated bandwidth part is switched and applied may be determined. In FIG. 4, a case in which the transition time 4-20 of one slot is required after the configuration switching indicator 4-15 is received is illustrated. In 4-60, data transmission/reception may not be performed during the transition time 4-20. Accordingly, bandwidth part #2 (4-10) is activated in slot #2 (4-35) and slot #3 (4-40), so that control channels and data can be transmitted and received through the corresponding bandwidth part.

The base station may previously configure one or a plurality of bandwidth parts with respect to the UE by higher layer signaling (e.g., RRC signaling), and the configuration switching indicator 4-15 may instruct the activation in a manner that the base station is mapped with one of the configurations of the previously configured bandwidth parts. For example, an indicator of $\log_2 N$ bits may select and indicate one of N previously configured bandwidth parts. In Table 3 below, an example of indicating configuration information for a bandwidth part using a 2-bit indicator is described.

TABLE 3

| Indicator value | Bandwidth part configuration |
| --- | --- |
| 00 | Bandwidth configuration A configured by higher layer signaling |
| 01 | Bandwidth configuration B configured by higher layer signaling |
| 10 | Bandwidth configuration C configured by higher layer signaling |
| 11 | Bandwidth configuration D configured by higher layer signaling |

The configuration switching indicator 4-15 for the bandwidth part described in FIG. 4 may be transmitted from the base station to the UE in the form of medium access control (MAC) control element (CE) signaling or L1 signaling (e.g., common DCI, group-common DCI, or UE-specific DCI).

In accordance with the configuration switching indicator 4-15 for the bandwidth part described in FIG. 4, a point in time at which the bandwidth part activation is applied may depend on the following: From what point in time the configuration switching is applied depends on a predefined value (e.g., applied from N (≥1) slots after the reception of the configuration switching indicator); from what point in time the configuration switching is applied is configured from the base station to the UE through higher layer signaling (e.g., RRC signaling); or from what point in time the configuration switching is applied may be partially included in the content of the configuration switching indicator 4-15 and transmitted. Alternatively, the point in time at which the configuration switching is applied may be determined by a combination of the above-described methods. After receiving the configuration switching indicator 4-15 for the bandwidth part, the UE may apply the switched configuration from the point in time obtained by the above-described methods.

Figure 5:
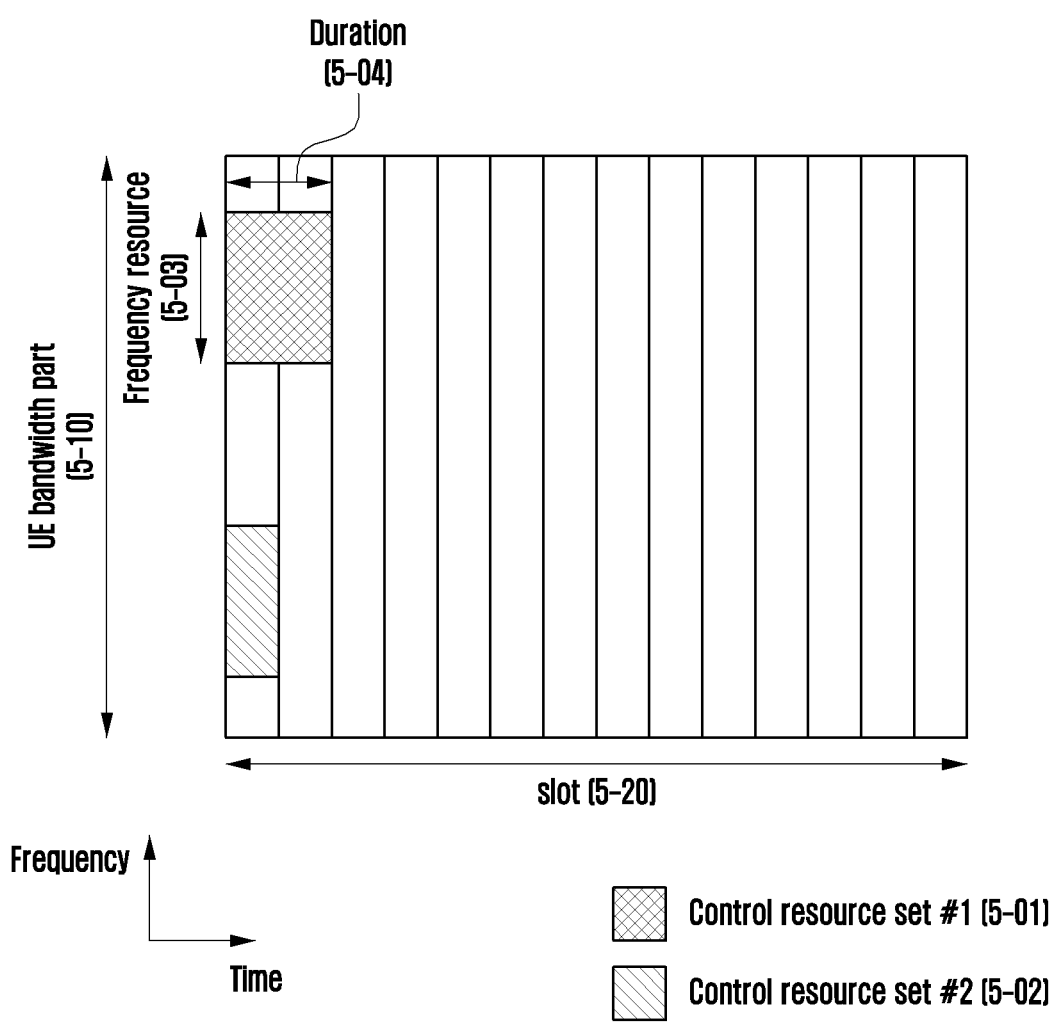
FIG. 5 is a diagram illustrating a control resource set (CORESET) in which a downlink control channel is transmitted in a 5G system according to an embodiment of the disclosure.

FIG. 5 is a diagram illustrating a control resource set (CORESET) in which a downlink control channel is transmitted in a 5G system according to an embodiment of the disclosure.

Referring to FIG. 5, in this embodiment of the disclosure, a bandwidth part 5-10 of a UE may be configured on the frequency axis, and two control resource sets (control resource set #1 (5-01) and control resource set #2 (5-02)) may be configured within one slit 5-20 on the time domain. The control resource sets 5-01 and 5-02 may be configured in a specific frequency resource 5-03 within the entire UE bandwidth part 5-10 on the frequency axis. The control resource sets 5-01 and 5-02 may be configured as one or a plurality of OFDM symbols on the time domain, and may be defined as a control resource set duration 5-04. In the example of FIG. 5, control resource set #1 (5-01) is configured as the control resource set duration of two symbols, and control resource set #2 (5-02) is configured as the control resource set duration of one symbol.

The control resource set in the 5G system described above may be configured by the base station through higher layer signaling (e.g., system information, master information block (MIB), radio resource control (RRC) signaling) with respect to the UE. Configuring the control resource set with respect to the UE means that information, such as a control resource set identity, a frequency position of the control resource set, and a symbol length of the control resource set is provided to the UE. For example, information for configuring the control resource set with respect to the UE may include information according to Table 4.

TABLE 4

```
ControlResourceSet ::=                    SEQUENCE {
    -- Corresponds to L1 parameter 'CORESET-ID'
    controlResourceSetId
    ControlResourceSetId,
    (control resource set identity)
    frequencyDomainResources            BIT STRING
(SIZE (45)),
    (frequency axis resource allocation information)
    duration                            INTEGER
(1..maxCoReSetDuration),
    (time domain resource allocation information)
    cce-REG-MappingType
    CHOICE {
    (CCE-to-REG mapping method)
        interleaved
```

TABLE 4-continued

```
SEQUENCE {
        reg-BundleSize
    ENUMERATED {n2, n3, n6},
    (REG bundle size)
        precoderGranularity
    ENUMERATED {sameAsREG-bundle, allContiguousRBs},
        interleaverSize
    ENUMERATED {n2, n3, n6}
        (interleaver size)
        shiftIndex
    INTEGER(0..maxNrofPhysicalResourceBlocks-1)
                                OPTIONAL
        (interleaver shift)
    },
    nonInterleaved                          NULL
    },
    tci-StatesPDCCH
    SEQUENCE(SIZE (1..maxNrofTCI-StatesPDCCH)) OF TCI-StateId
                OPTIONAL,
    (QCL configuration information)
    tci-PresentInDCI                ENUMERATED
{enabled}
                OPTIONAL, -- Need S
}
```

In Table 4, tci-StatesPDCCH (simply referred to as "TCI state") configuration information may include information, such as one or more synchronization signal (SS)/physical broadcast channel (PBCH) block (referred to as "SSB" or "SS/PBCH block") indexes in a Quasi co-located (QCL) relationship with a demodulation reference signal (DMRS) transmitted in the corresponding control resource set, or a channel state information reference signal (CSI-RS) index.

In a wireless communication system, one or more different antenna ports (or can be replaced with one or more channels, signals, and combinations thereof, but for convenience of description in the disclosure in the future, are collectively referred to as different antenna ports) can be associated with each other by the following QCL configuration.

```
QCL-Info ::=            SEQUENCE {
cell                ServCellIndex (serving cell index to which QCL
reference RS is transmitted)
bwp-Id              BWP-Id (bandwidth part index in which QCL
reference RS is transmitted)
referenceSignal             CHOICE { (indicator indicating one of
CSI-RS or SS/PBCH block as QCL reference RS)
csi-rs          NZP-CSI-RS-ResourceId,
ssb             SSB-Index
}
qcl-Type            ENUMERATED {typeA, typeB, typeC, typeD},
(QCL type indicator)
...
}
```

Specifically, QCL configuration may connect two different antenna ports in the relationship between a (QCL) target antenna port and a (QCL) reference antenna port. The UE may apply (or assume) all or part of the statistical characteristics (e.g., large scale parameters of a channel, such as Doppler shift, Doppler spread, average delay, delay spread, average gain, spatial Rx {or Tx} parameters, and a reception spatial filter coefficient or a transmission spatial filter coefficient of the UE) of a channel measured in the reference antenna port when receiving the target antenna port. In the above, the target antenna port refers to an antenna port for transmitting a channel or signal configured by higher layer configuration including the QCL configuration, or an antenna port for transmitting a channel or signal to which a TCI state indicating the QCL configuration is applied. In the above, the reference antenna port refers to an antenna port for transmitting a channel or signal indicated (specified) by a referenceSignal parameter in the QCL configuration.

Specifically, the statistical characteristics of the channel (indicated by the parameter QCL-Type in the QCL configuration) defined by the QCL configuration may be classified as follows according to the QCL Type.

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

In this case, the kinds of the QCL Type are not limited to the above four kinds, but all possible combinations are not listed in order not to obscure the subject matter of explanation. In the above, QCL-TypeA is a QCL Type used when all statistical characteristics that can be measured in the frequency and time domain can be referenced because both the bandwidth and transmission interval of the target antenna port are sufficient compared to the reference antenna port (that is, when the number of samples and transmission band/time of the target antenna port on both the frequency domain and the time domain are larger than the number of samples and transmission band/time of the reference antenna port). QCL-TypeB is a QCL Type used when the bandwidth of the target antenna port is sufficient to measure statistical characteristics measurable in the frequency axis, that is, Doppler shift and Doppler spread, and the like. QCL-TypeC is a QCL Type used when the bandwidth and transmission interval of the target antenna port are insufficient to measure second-order statistics, i.e., Doppler spread and delay spread, and thus only first-order statistics, i.e., only Doppler shift and average delay can be referenced. QCL-TypeD is a QCL Type configured when spatial reception filter values used when receiving the reference antenna port can be used when receiving the target antenna port.

Meanwhile, the base station can configure or indicate up to two QCL configurations in one target antenna port through the following TCI state configuration.

```
TCI-State ::=   SEQUENCE {
    tci-StateId     TCI-StateId, (TCI state indicator)
    qcl-Type1       QCL-Info, (first QCL configuration for target
antenna port to which corresponding TCI state is applied)
    qcl-Type2       QCL-Info (Second QCL configuration for target antenn
a port to which corresponding TCI state is applied) OPTIONAL, -- Need
R
    ...
}
```

Among the two QCL configurations included in one TCI state configuration, the first QCL configuration may be configured as one of QCL-TypeA, QCL-TypeB, and QCL-TypeC. At this time, the configurable QCL type is specified according to the types of the target antenna port and the reference antenna port, and will be described below. In addition, among the two QCL configurations included in the one TCI state configuration, the second QCL configuration may be configured as QCL-TypeD and may be omitted in some cases.

Tables 4-1 to 4-5 below show valid TCI state configurations according to the target antenna port type.

Table 4-1 shows valid TCI state configuration when the target antenna port is CSI-RS for tracking (TRS). The TRS refers to an NZP CSI-RS in which a repetition parameter is not configured among CSI-RSs and trs-info is configured as true. Configuration 3 in Table 4-1 can be used for aperiodic TRS.

TABLE 4-1

Valid TCI state configuration when target
antenna port is CSI-RS for tracking (TRS)

| Valid TCI state configuration | DL RS 1 | QCL-Type1 | DL RS 2 (if configured) | QCL-Type2 (if configured) |
|---|---|---|---|---|
| 1 | SSB | QCL-TypeC | SSB | QCL-TypeD |
| 2 | SSB | QCL-TypeC | CSI-RS (BM) | QCL-TypeD |
| 3 | TRS (periodic) | QCL-TypeA | TRS (same as DL RS 1) | QCL-TypeD |

Table 4-2 shows valid TCI state configuration when the target antenna port is CSI-RS for CSI. The CSI-RS for CSI refers to an NZP CSI-RS in which the repetition parameter is not configured among CSI-RS and trs-info is not configured as true.

TABLE 4-2

Valid TCI state configuration when target
antenna port is CSI-RS for CSI

| Valid TCI state configuration | DL RS 1 | QCL-Type1 | DL RS 2 (if configured) | QCL-Type2 (if configured) |
|---|---|---|---|---|
| 1 | TRS | QCL-TypeA | SSB | QCL-TypeD |
| 2 | TRS | QCL-TypeA | CSI-RS for BM | QCL-TypeD |
| 3 | TRS | QCL-TypeA | TRS (same as DL RS 1) | QCL-TypeD |
| 4 | TRS | QCL-TypeB | | |

Table 4-3 shows valid TCI state configuration when the target antenna port is CSI-RS for beam management (same meaning as BM, CSI-RS for L1 RSRP reporting). The CSI-RS for BM refers to an NZP CSI-RS in which the repetition parameter is configured among CSI-RSs to have a value of on or off and trs-info is not configured as true.

TABLE 4-3

Valid TCI state configuration when target antenna
port is CSI-RS for BM (for L1 RSRP reporting)

| Valid TCI state configuration | DL RS 1 | QCL-Type1 | DL RS 2 (if configured) | QCL-Type2 (if configured) |
|---|---|---|---|---|
| 1 | TRS | QCL-TypeA | TRS (same as DL RS 1) | QCL-TypeD |
| 2 | TRS | QCL-TypeA | CSI-RS (BM) | QCL-TypeD |
| 3 | SS/PBCH Block | QCL-TypeC | SS/PBCH Block | QCL-TypeD |

Table 4-4 shows valid TCI state configuration when the target antenna port is a PDCCH DMRS.

TABLE 4-4

Valid TCI state configuration when
target antenna port is PDCCH DMRS

| Valid TCI state configuration | DL RS 1 | QCL-Type1 | DL RS 2 (if configured) | QCL-Type2 (if configured) |
|---|---|---|---|---|
| 1 | TRS | QCL-TypeA | TRS (same as DL RS 1) | QCL-TypeD |
| 2 | TRS | QCL-TypeA | CSI-RS (BM) | QCL-TypeD |
| 3 | CSI-RS (CSI) | QCL-TypeA | CSI-RS (same as DL RS 1) | QCL-TypeD |

Table 4-5 shows valid TCI state configuration when the target antenna port is a PDSCH DMRS.

TABLE 4-5

Valid TCI state configuration when
target antenna port is PDSCH DMRS

| Valid TCI state configuration | DL RS 1 | QCL-Type1 | DL RS 2 (if configured) | QCL-Type2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3 | CSI-RS (CSI) | QCL-TypeA | CSI-RS (CSI) | QCL-TypeD |

In the typical QCL configuration method according to Tables 4-1 to 4-5, the target antenna port and the reference antenna port for each operation are configured and operated as "SSB"→"TRS"→"CSI-RS for CSI, or CSI-RS for BM, or PDCCH DMRS, or PDSCH DMRS". Through this, it is possible to help the reception operation of the UE by linking the statistical characteristics that can be measured from the SSB and the TRS up to each antenna port.

Hereinafter, embodiments of the disclosure will be described together with the accompanying drawings. Hereinafter, an embodiment of the disclosure will be described using a 5G system as an example, but the embodiment of the disclosure may be applied to other communication systems having similar technical backgrounds or channel types. For example, LTE or LTE-A mobile communication and mobile communication technology developed after 5G may be included therein. Accordingly, the embodiments of the disclosure may be applied to other communication systems through some modifications without significantly departing from the scope of the disclosure, as determined by a person skilled in the art.

In addition, in describing the disclosure, when it is determined that a detailed description of a related function or configuration may unnecessarily obscure the subject matter of the disclosure, a detailed description thereof will be omitted. In addition, terms to be described later are terms defined based on functions in the disclosure and may vary according to the intention or custom of users or operators. Therefore, the definition should be made based on the contents throughout this specification.

In addition, the abbreviations used in the specification hereinafter have the following meanings unless otherwise specified.

CSI: channel state information
RS: reference signal
L1: layer 1
RSRP: reference signal received power
DL: downlink
UL: uplink
BWP: bandwidth part
NZP CSI-RS: non zero power CSI-RS
CSI-IM: CSI interference measurement
VZP CSI-RS: virtual zero power CSI-RS
CSI-VIM: CSI virtual interference measurement FIG. 6 is a diagram illustrating a signal processing procedure of a transceiver supporting time-only processing according to an embodiment of the disclosure.

Figure 6:
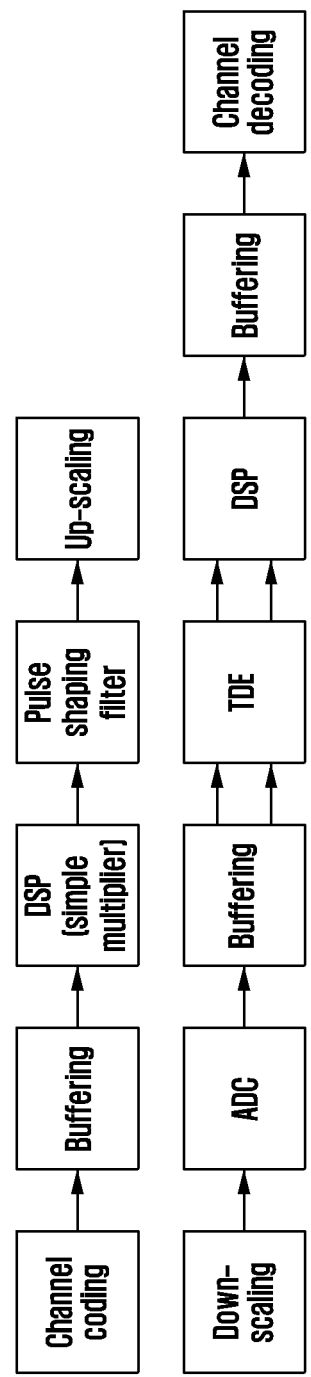
FIG. 6 is a diagram illustrating a signal processing procedure of a transceiver supporting time-only processing according to an embodiment of the disclosure.

Referring to FIG. 6, it illustrates an operation of a transceiver for transmitting and receiving an ultra-high frequency broadband signal without processing a frequency signal. In the case of a transmitter, a channel-coded symbol is buffered and converted into a wideband baseband signal through signal processing. Next, the wideband baseband signal is passed through a pulse shaping filter, is upscaled into an ultra-high frequency signal, and then transmitted. A receiver first downscales a signal received through an antenna, converts the downscaled signal into a broadband baseband signal, and converts the converted signal into a digital signal through an analog-to-digital converter (ADC) and stores the digital signal. Next, the corresponding channel is compensated through time-domain equalization, and the digital signal is converted into a modulated signal through signal processing and is stored. Next, the received signal is converted through a demodulator. As described above, the transmitter and the receiver according to an embodiment of the disclosure may not undergo an FFT or IFFT block for processing a frequency signal in a signal processing process (a process of converting a symbol into a wideband baseband signal), and the transmitter or receiver supporting such a signal processing process is referred to as a transceiver supporting time-only processing. In the disclosure, as the transceiver supporting time-only processing, a transmitter and a receiver that support the time-only processing, a transmitter that supports the time-only processing and a receiver that does not support the same, a transmitter that does not support the time-only processing and a receiver that supports the same, and a receiver that does not support the time-only processing but supports the time-only processing only for channel estimation may be used.

Figure 7A:
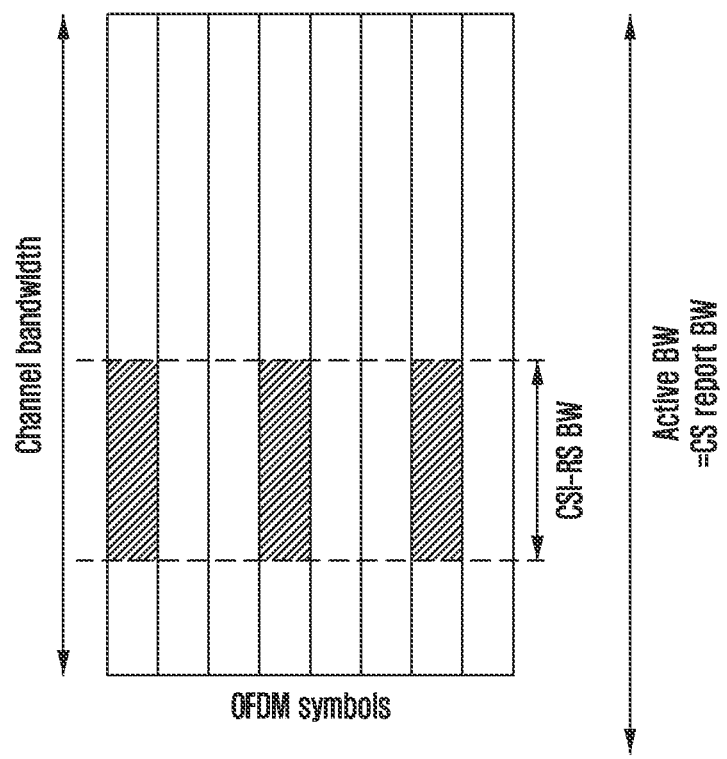
FIG. 7A is a diagram illustrating an embodiment of a method of transmitting a CSI-RS signal by a transmitter according to an embodiment of the disclosure.
Figure 7B:
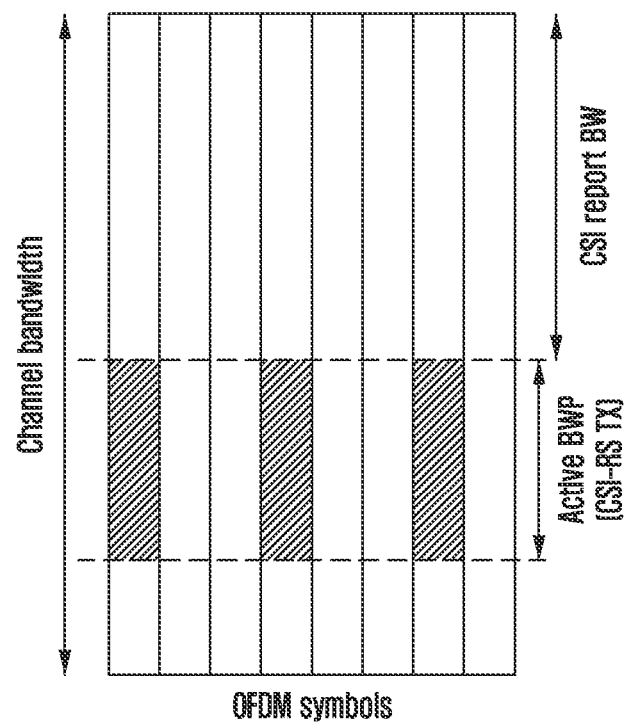
FIG. 7B is a diagram illustrating an embodiment of a method of transmitting a CSI-RS signal by a transmitter according to an embodiment of the disclosure.
Figure 7C:
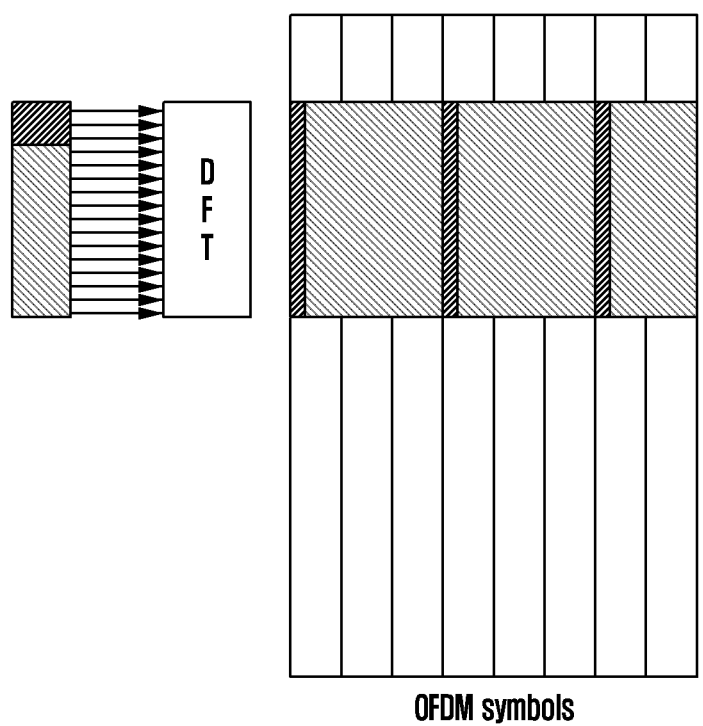
FIG. 7C is a diagram illustrating an embodiment of a method of transmitting a CSI-RS signal by a transmitter according to an embodiment of the disclosure.
Figure 7D:
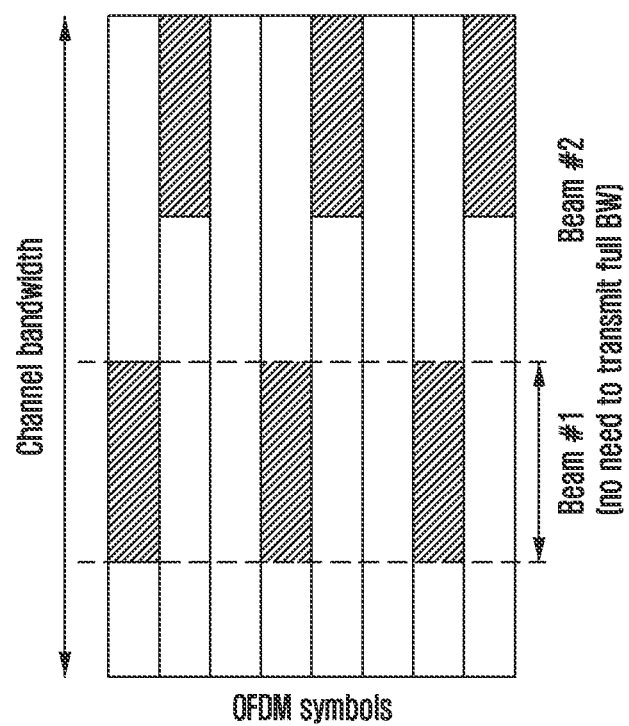
FIG. 7D is a diagram illustrating an embodiment of a method of transmitting a CSI-RS signal by a transmitter according to an embodiment of the disclosure.

FIG. 7A is a diagram illustrating an embodiment of a method of transmitting a CSI-RS signal by a transmitter according to an embodiment of the disclosure, FIG. 7B is a diagram illustrating an embodiment of a method of transmitting a CSI-RS signal by a transmitter according to an embodiment of the disclosure, FIG. 7C is a diagram illustrating an embodiment of a method of transmitting a CSI-RS signal by a transmitter according to an embodiment of the disclosure, and FIG. 7D is a diagram illustrating an embodiment of a method of transmitting a CSI-RS signal by a transmitter according to an embodiment of the disclosure.

Referring to FIG. 7A, it is a diagram illustrating an example in which the entire RF band is an active BWP and a CSI-RS is transmitted using a partial frequency-band included in the active BWP, referring to FIG. 7B, it is a diagram illustrating an example in which a partial frequency band of the entire RF band is an active BWP and a CSI-RS is transmitted using the active BWP band, referring to FIG. 7C, it is a diagram illustrating an example in which a CSI-RS is transmitted using a part of an OFDM symbol, and referring to FIG. 7D, it is a diagram illustrating an example in which a CSI-RS using a first partial frequency band is transmitted by beam 1 and a CSI-RS using a second partial frequency band is transmitted by beam 2.

According to an embodiment of the disclosure, in the case of the CSI-RS transmission method illustrated in FIGS. 7A to 7D, each of the transmitter and the receiver may assume the following conditions.

TABLE 5

| | Transmitter | Receiver |
|---|---|---|
| FIG. 7A | partial frequency-band transmission within RF bandwidth, full symbol transmission, same beam for RF band, active BWP = RF bandwidth | same beam assumption of received channel, use receive time-sampled signal |

TABLE 5-continued

| | Transmitter | Receiver |
|---|---|---|
| FIG. 7B | partial frequency-band transmission within RF bandwidth, full symbol transmission, same beam for RF band, active BWP = partial frequency-band | same beam assumption of received channel, use receive time-sampled signal |
| FIG. 7C | partial frequency-band transmission within RF bandwidth, sub-symbol transmission, same beam for RF band | same beam assumption of received channel, use receive time-sampled signal |
| FIG. 7D | partial frequency-band transmission within RF bandwidth, full symbol transmission, different beam for sub-band with multi-panel | different beam assumption of received channel, use time-sampled signal |

A channel estimation method according to the disclosure proposes a method of transmitting a CSI-RS to a DL BWP or an active DL BWP received by the UE as described above, and performing CSI report with respect to time and frequency resources other than the DL BWP or the active DL BWP to which the CSI-RS is transmitted or with respect to the DL BWP which is not received.

Example of Receiver Algorithm

If a time sample in a received n-th pilot symbol is $y_n \in C^{N_F \times 1}$, $y_n$ can be expressed as Equation 1 below.

$$y_n = H_n F^* s_n + z_n \qquad \text{Equation 1}$$

Here, $H \in C^{N_F \times N_F}$ denotes a channel matrix, and denotes an IFFT matrix. $s_n \in C^{N_F \times 1}$ denotes a transmitted pilot vector, such as a Zadoff-chu sequence or a DFT-spread pilot symbol, and $z_n \in C^{N_F \times 1}$ denotes additive white Gaussian noise $z_n \sim CN(0, \sigma^2 I_{N_F})$. The channel matrix can be expressed as $H = F \cdot AF$ (where $A = \sqrt{N_F} \text{ diag}(h_n)$) Here, $h_n$ denotes a frequency channel response of an n-th pilot symbol. Therefore, $y_n$ can be expressed as the following Equation 2.

$$y_n = \sqrt{N_F} F^* \text{diag}(s_n) h_n + z_n \qquad \text{Equation 2}$$

According to an embodiment of the disclosure, since the pilot symbol is transmitted in a partial bandwidth rather than the entire bandwidth, the pilot vector $s_n$ can be expressed using $p_n$ and a frequency selection matrix $\Phi_n$, and thus Equation 1 can be expressed as Equation 3 below.

$$y_n = \sqrt{N_F} F^* \Phi_n^T \text{diag}(p_n) \Phi_n h_n + z_n \qquad \text{Equation 3}$$

The frequency channel and a channel impulse response (CIR) have a relationship of $h_n = F g_n$, where $g_n$ denotes CIR. Therefore, $y_n$ can be expressed as the following Equation 4.

$$y_n = \sqrt{N_F} F^* \Phi_n^T \text{diag}(p_n) \Phi_n F g_n + z_n \qquad \text{Equation 4}$$

Based on a cyclic prefix of the transmitted symbol, all can be assumed to be zero after the CP length. In this case, $g_n = [g'_n \, 0_{N_F - N_{zp}}]^T$ is satisfied, and $y_n$ can be expressed as the following Equation 5.

$$y_n = \sqrt{N_F}\, F^* \Phi_n^T \mathrm{diag}(p_n) \Phi_n F \Pi g'_n + z_n \qquad \text{Equation 5}$$

Here, Π denotes a selection matrix.

Hereinafter, a method of receiving a signal using the time sample of a received pilot symbol according to an embodiment of the disclosure will be described.

Figure 8:
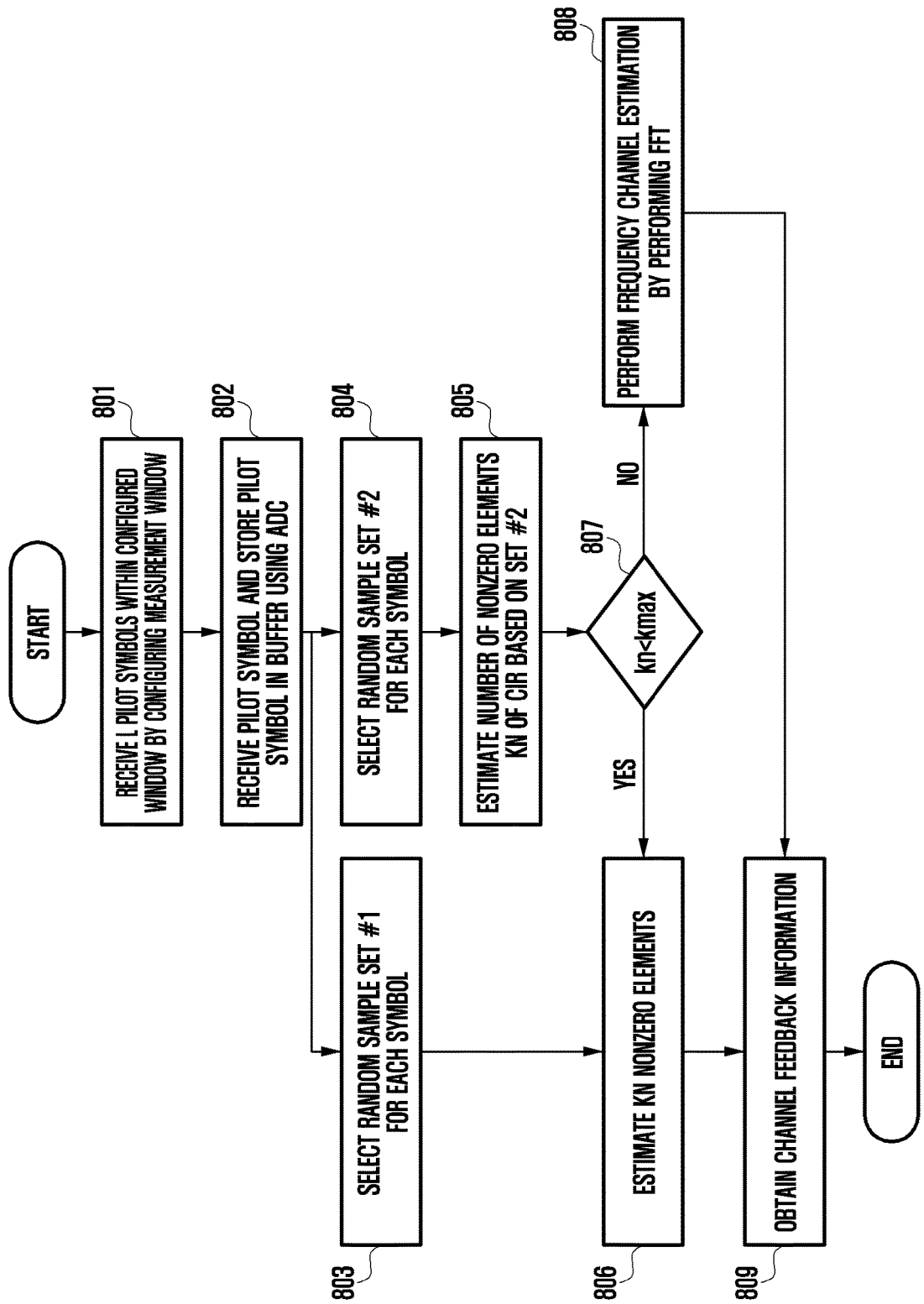
FIG. 8 is a flowchart illustrating an operation of a user equipment (UE) for channel estimation according to an embodiment of the disclosure.

FIG. 8 is a flowchart illustrating an operation of a UE for channel estimation according to an embodiment of the disclosure.

Referring to FIG. 8, first, in operation 801, a UE may simultaneously process signals received within a window which is configured with a measurement window by a base station. This may mean that a channel having the same path or the same channel statistical characteristics is measured for pilot signals received within the configured window. For example, it can be configured to receive L pilot symbols in the window. Next, in operation 802, the UE may store a signal received for each pilot symbol in a buffer through an analog-to-digital converter (ADC). In operations 803 and 804, the time samples of the pilot symbols may be divided into two groups. The two separated groups are samples that do not overlap each other, and the total sum of the samples of the two groups may be equal to or less than the entire time sample. The first group is a group for channel estimation, and the second group is a group for determining the number of nonzero elements of a CIR.

The samples of the first group for channel estimation are randomly selected from all symbols, and when the selected samples are collected, it can be expressed as in Equation 6 below.

$$y'_n = \sqrt{N_F}\, \Lambda_n F^* \Phi_n^T \mathrm{diag}(p_n) \Phi_n F \Pi g'_n + z_n \qquad \text{Equation 6}$$

Here, $\Lambda_D$ denotes a random selection matrix.

If $U_n = N_F \Lambda_n F \cdot \Phi_n^T \mathrm{diag}\,(p_n) \Phi_n\, F\Pi$, $y'_n$ is satisfied, Equation 6 can be expressed as Equation 7 below.

$$y_n^f = U_n g_n^f + z_n \qquad \text{Equation 7}$$

If the samples of the L pilot symbols are accumulated, it can be expressed as follows.

$$\begin{bmatrix} y'_{n-L} \\ \vdots \\ y'_n \end{bmatrix} = \begin{bmatrix} U_{n-L} & \cdots \\ \vdots & \ddots & \vdots \\ & \cdots & U_n \end{bmatrix} \begin{bmatrix} g'_{n-L} \\ \vdots \\ g'_n \end{bmatrix} + \begin{bmatrix} z_{n-L} \\ \vdots \\ z_n \end{bmatrix} \qquad \text{Equation 8}$$

If Equation 8 is rearranged in delay order, it can be expressed as Equation 9 below.

$$y''_n = \left[ \sum\nolimits_{n,1}, \cdots, \sum\nolimits_{n,CP} \right] \begin{bmatrix} d_{n,1} \\ \vdots \\ d_{n,CP} \end{bmatrix} + z''_n \qquad \text{Equation 9}$$

Here, $\Sigma_{n,i} = [U_{n-L}(:,i) \ldots U_n(:,i)]$ and $d_{n,i} = [g'_{n-L}(i) \ldots g'_n(i)]$ are satisfied. Here, since Equation 9 is an underdetermined system, the receiver can iteratively estimate the CIR as shown in Equations 10 and 11 below.

$$k' = \mathrm{argmax}_k \left\| \sum\nolimits_{n,k} y''_n \right\|_2^2 \qquad \text{Equation 10}$$

$$d_{n,k} = \left[ R_n \sum\nolimits_{n,k'}^H \right] \left[ \sum\nolimits_{n,k} R_n \sum\nolimits_{n,k'}^H + \sigma_z^2 I \right]^{-1} y''_n \qquad \text{Equation 11}$$

Here, $R_n$ denotes a covariance matrix of a channel tap. This reception method has an advantage that an FFT operation is not required because the UE can be subjected to processing on the time domain, and the reception performance increases along with a reduction in the number of major paths of the channel of the CIR. In addition, since the CIR on the delay axis is estimated using samples on the time domain, when FFT is performed after completing the estimation, the channel on the frequency axis can be restored, and even if the CSI-RS does not transmit the entire band, the channel in the entire frequency domain can be estimated.

The second group can be used for estimating the number of nonzero elements of the CIR. Referring to FIG. 8, in operation 805, the number of nonzero elements minimizing residual may be estimated using an algorithm, such as orthogonal matching pursuit (OMP) for each L measurements. For example, if a nonzero element that makes the residual not less than 0 in an n-th measurement is $k_n$, $k_n$ having the largest $P(k_n)$ is selected.

Referring to FIG. 8, in operation 807, the UE determines whether the selected $k_n$ is greater than or less than $K_{max}$. If $k_n$ is greater than $K_{max}$, as in operation 808, the UE uses an existing frequency-based channel estimation technique (linear minimum mean square error, LMMSE), and if $k_n$ is less than $K_{max}$, as in operation 806, the number of iterations of a CIR estimator is configured as $k_n$, and sample-based channel estimation according to an embodiment of the disclosure may be used.

[UE Operation for CSI Report]

Hereinafter, a method of reporting a CSI for a time or frequency resource in which the CSI-RS is not transmitted will be described.

The UE may instruct the base station to report CSI using the time or frequency resource. The type of the CSI may include at least one of the following elements.

CQI: channel quality indicator
PMI: precoding matrix indicator
CRI: CSI-RS resource indicator
SSBRI: SS/PBCH block resource indicator
L1: layer indicator
RI: rank indicator
L1-RSRP In order to report the CSI elements, the UE may obtain the following three pieces of information by higher level signaling.

Report settings: CSI report configuration information consisting of N-numbered CSI-ReportConfig
Resource settings: CSI report configuration information consisting of M-numbered CSI-ResourceConfig
List of triggering state: It may include at least one or more CSI-ReportConfig lists capable of measuring channel and interference through resource set ID.

Hereinafter, a report setting method for CSI report, a resource setting method, a report configuration method, a triggering and activation method, a processing standard, a CSI definition, a CSI-RS definition, and a CSI reporting method according to an embodiment of the disclosure will be described.

Report Settings

The channel estimation method according to an embodiment of the disclosure is a method of transmitting a CSI-RS to a DL BWP or an active DL BWP received by the UE, and performing CSI report with respect to time and frequency resources other than the DL BWP or the DL BWP which is not received.

The existing report setting method is as follows. One report setting (CSI-ReportConfig) can be configured for one DL BWP, and channel measurement is possible only for the configured DL BWP. CSI-ReportConfig may include at least one of a codebook configuration for CSI reporting, time domain information for reporting, frequency resolution information for CQI and PMI reporting, and measurement restriction information for CSI reporting. The time domain information for reporting may include reportConfigType information for reporting CSI, and may include one of aperiodic, semiPersistentOnPUCCH, semiPresistentonPUSCH, and periodic. Aperiodic refers to a one-time reporting, semiPersistentOnPUCCH refers to semi-permanent transmission through PUCCH, semiPersistentOnPUSCH refers to semi-permanent transmission through PUSCH, and periodic refers to periodic transmission. The measurement restriction information for CSI reporting may include time restriction information for channel measurement or time restriction information for interference measurement. The codebook information may include codebook type and restriction.

The existing CSI-ReportConfig as described above may be configured to include the following information.

```
CSI-ReportConfig ::=                        SEQUENCE {
  reportConfigId                              CSI-ReportConfigId,
  carrier                                 ServCellIndex          OPTIONAL, -- Need S
  resourcesForChannelMeasurement              CSI-ResourceConfigId,
  csi-IM-ResourcesForInterference             CSI-ResourceConfigId
OPTIONAL, -- Need R
  nzp-CSI-RS-ResourcesForInterference         CSI-ResourceConfigId
OPTIONAL, -- Need R
  reportConfigType                            CHOICE {
    periodic                                  SEQUENCE {
      reportSlotConfig                          CSI-ReportPeriodicityAndOffset,
      pucch-CSI-ResourceList                    SEQUENCE (SIZE (1..maxNrofBWPs))
OF PUCCH-CSI-Resource
    },
    semiPersistentOnPUCCH                     SEQUENCE {
      reportSlotConfig                          CSI-ReportPeriodicityAndOffset,
      pucch-CSI-ResourceList                    SEQUENCE (SIZE (1..maxNrofBWPs))
OF PUCCH-CSI-Resource
    },
    semiPersistentOnPUSCH                     SEQUENCE {
      reportSlotConfig                          ENUMERATED {sl5, sl10, sl20, sl40, sl80,
sl160, sl320},
      reportSlotOffsetList                      SEQUENCE (SIZE (1.. maxNrofUL-
Allocations)) OF INTEGER(0..32),
      p0alpha                                   P0-PUSCH-AlphaSetId
    },
    aperiodic                                 SEQUENCE {
      reportSlotOffsetList                      SEQUENCE (SIZE (1..maxNrofUL-
Allocations)) OF INTEGER(0..32)
    }
  },
  reportQuantity                              CHOICE {
    none                                      NULL,
    cri-RI-PMI-CQI                            NULL,
    cri-RI-i1                                 NULL,
    cri-RI-i1-CQI                             SEQUENCE {
      pdsch-BundleSizeForCSI                    ENUMERATED {n2, n4}
OPTIONAL -- Need S
    },
    cri-RI-CQI                                NULL,
    cri-RSRP                                  NULL,
    ssb-Index-RSRP                            NULL,
    cri-RI-LI-PMI-CQI                         NULL
  },
  reportFreqConfiguration                     SEQUENCE {
    cqi-FormatIndicator                       ENUMERATED { widebandCQI,
subbandCQI }                              OPTIONAL, -- Need R
    pmi-FormatIndicator                       ENUMERATED { widebandPMI,
subbandPMI }                              OPTIONAL, -- Need R
    csi-ReportingBand                         CHOICE {
      subbands3                                 BIT STRING(SIZE(3)),
      subbands4                                 BIT STRING(SIZE(4)),
      subbands5                                 BIT STRING(SIZE(5)),
      subbands6                                 BIT STRING(SIZE(6)),
      subbands7                                 BIT STRING(SIZE(7)),
      subbands8                                 BIT STRING(SIZE(8)),
      subbands9                                 BIT STRING(SIZE(9)),
      subbands10                                BIT STRING(SIZE(10)),
      subbands11                                BIT STRING(SIZE(11)),
      subbands12                                BIT STRING(SIZE(12)),
      subbands13                                BIT STRING(SIZE(13)),
```

```
    subbands14                      BIT STRING(SIZE(14)),
    subbands15                      BIT STRING(SIZE(15)),
    subbands16                      BIT STRING(SIZE(16)),
    subbands17                      BIT STRING(SIZE(17)),
    subbands18                      BIT STRING(SIZE(18)),
    ...,
    subbands 19-V1530               BIT STRING(SIZE(19))
  } OPTIONAL -- Need S
 }                                                  OPTIONAL,
-- Need R
  timeRestrictionForChannelMeasurements   ENUMERATED {configured,
notConfigured},
  timeRestrictionForInterferenceMeasurements   ENUMERATED {configured,
notConfigured},
  codebookConfig                  CodebookConfig
OPTIONAL, -- NeedR
  dummy                           ENUMERATED {n1, n2}
OPTIONAL, -- Need R
  groupBasedBeamReporting         CHOICE {
    enabled                       NULL,
    disabled                      SEQUENCE {
      nrofReportedRS              ENUMERATED {n1, n2, n3, n4}
OPTIONAL -- Need S
    }
  },
  cqi-Table    ENUMERATED {table1, table2, table3, spare1}
OPTIONAL, -- Need R
  subbandSize   ENUMERATED {value1, value2},
  non-PMI-PortIndication   SEQUENCE (SIZE (1..maxNrofNZP-CSI-RS-
ResourcesPerConfig)) OF PortIndexFor8Ranks OPTIONAL,    -- Need R
  ...,
  [[
  semiPersistentOnPUSCH-v1530          SEQUENCE {
    reportSlotConfig-v1530             ENUMERATED {sl4, sl8, sl16{
  }                                               OPTIONAL
-- Need R
 ]]
}
```

According to an embodiment of the disclosure, one report setting (CSI-ReportConfig) may be configured for a first DL BWP and a second DL BWP in which a time or frequency band overlaps. In this case, channel measurement through NZP CSI-RS and CSI-IM may be performed with respect to the first DL BWP, and measurement through VZP CSI-RS or CSI-VIM may be performed with respect to the second DL BWP. Here, the VZP CSI-RS and the CSI-IM may refer to virtual CSI-RS and CSI-IM that are not actually transmitted by the base station. For example, the base station according to an embodiment of the disclosure may configure a virtual CSI-RS or CSI-IM, and may instruct the UE to assume that the CSI-RS or CSI-IM is transmitted in a frequency domain in which the CSI-RS or CSI-IM is not transmitted, to estimate a channel, and to perform reporting, whereby it is possible to estimate and report the corresponding channel even in a frequency domain in which the CSI-RS and the CSI-IM are not transmitted. CSI-ReportConfig may include at least one of a codebook configuration for CSI reporting, time domain information for reporting, frequency resolution information for CQI and PMI reporting, and measurement restriction information for CSI reporting. The time domain information for reporting may include reportConfigType information for reporting CSI, and this may include one of aperiodic, semiPersistentOnPUCCH, semiPresistentonPUSCH, and periodic. The aperiodic refers to one-time reporting, the semiPersistentOnPUCCH refers to semi-permanent transmission through PUCCH, the semiPersistentOnPUSCH refers to semi-permanent transmission through PUSCH, and the periodic refers to periodic transmission. The measurement restriction information for CSI reporting may include time restriction information for channel measurement or time restriction information for interference measurement, and the codebook information may include codebook type (type I, type II) and restriction. The measurement restriction information for CSI reporting based on VZP CSI-RS or CSI-VIM may include time restriction information for a channel of the second DL BWP or time restriction information for interference measurement. The codebook information may include codebook type (type III) and restriction information.

According to another embodiment of the disclosure, one report setting (CSI-ReportConfig) may be configured for one DL BWP. At this time, channel measurement through NZP CSI-RS and CSI-IM is possible for the configured DL BWP, and measurement through VZP CSI-RS or CSI-VIM may be possible for a time or frequency domain other than the configured DL BWP. The CSI-ReportConfig may include at least one of a codebook configuration for CSI reporting, time domain information for reporting, frequency resolution information for CQI and PMI reporting, and measurement restriction information for CSI reporting. The time domain information for reporting may include reportConfigType information for reporting CSI, and may include one of aperiodic, semiPersistentOnPUCCH, semiPresistentonPUSCH, and periodic. The aperiodic refers to one-time reporting, the semiPersistentOnPUCCH refers to semi-permanent transmission through PUCCH, the semiPersistentOnPUSCH refers to semi-permanent transmission through PUSCH, and the periodic refers to periodic transmission. The measurement restriction information for CSI reporting may include time restriction information for channel measurement or time restriction information for interference measurement, and the codebook information may include codebook type (type I, type II) and restriction. The measurement restriction information for CSI reporting based on VZP CSI-RS or CSI-VIM may include time restriction information for a channel in a time or frequency domain other than the configured DL BWP or time restriction information for interference measurement, and the codebook information may include codebook type (type III) and restriction information.

Resource Settings

The existing resource setting method is as follows. The CSI-ResourceConfig includes S-numbered CSI resource set lists, and each list includes NZP CSI-RS, SS/PBCH set, and CSI-IM resource set information. Each CSI resource setting is configured for one DL BWP, and a report setting corresponding to the resource setting is also configured for the same DL BWP. The CSI resource setting includes at least one or more of the following information for measuring a channel or interference.

CSI-IM resource: for interference measurement
NZP CSI-RS resource for interference measurement: for interference measurement
NZP CSI-RS resource for channel measurement: for channel measurement When the UE estimates a channel using one or more NZP CSI-RS resources for one CSI reporting and measures interference using one or more CSI-IMs, it may be assumed that the NZP CSI-RS and the CSI-IM are type D quasi-co-located (QCL-TypeD) for each resource. When the UE measures interference using the NZP CSI-RS, it may be assumed that the NZP CSI-RS for measuring the channel and the CSI-IM and the NZP CSI-RS for measuring the interference are quasi-co-located as QCL-TypeD.

The existing CSI-ResourceConfig as described above may be configured including the following information.

```
CSI-ResourceConfig ::=   SEQUENCE {
csi-ResourceConfigId   CSI-ResourceConfigId,
csi-RS-ResourceSetList   CHOICE {
nzp-CSI-RS-SSB   SEQUENCE {
nzp-CSI-RS-ResourceSetList   SEQUENCE (SIZE (1..maxNrofNZP-
CSI-RS-ResourceSetsPerConfig)) OF NZP-CSI-RS-ResourceSetId
OPTIONAL, -- Need R
csi-SSB-ResourceSetList   SEQUENCE (SIZE (1..maxNrofCSI-SSB-
ResourceSetsPerConfig)) OF CSI-SSB-ResourceSetId
OPTIONAL -- Need R
},
csi-IM-ResourceSetList   SEQUENCE (SIZE (1..maxNrofCSI-IM-
ResourceSetsPerConfig)) OF CSI-IM-ResourceSetId
},
bwp-Id         BWP-Id,
resourceType        ENUMERATED { aperiodic, semiPersistent,
periodic },
...
}
```

According to an embodiment of the disclosure, CSI-ResourceConfig includes S-numbered CSI resource set lists, and each list includes at least one piece of NZP CSI-RS set, SS/PBCH set, CSI-IM resource set, VZP CSI-RS set, CSI-VIM resource set information. From each CSI resource setting, the NZP CSI-RS set, the SS/PBCH set, and the CSI-IM resource set are configured for the first DL BWP, and the VZP CSI-RS set and the CSI-VIM resource set are configured for the second DL BWP. A report setting corresponding to the resource setting may also be configured for the first DL BWP and the second DL BWP. The CSI resource setting may include at least one or more pieces of the following information for channel or interference measurement.

CSI-IM resource: for interference measurement of first DL BWP
NZP CSI-RS resource for interference measurement: for interference measurement of first DL BWP
NZP CSI-RS resource for channel measurement: for channel measurement of first DL BWP
VZP CSI-RS resource for channel measurement: for channel measurement of second DL BWP
CSI-VIM resource: for interference measurement of second DL BWP
VZP CSI-RS resource for interference measurement: for interference measurement of second DL BWP When the UE estimates a channel using one or more NZP CSI-RS resources for one CSI reporting and measures interference using one or more CSI-IMs, it may be assumed that the NZP CSI-RS and the CSI-IM are type D quasi-co-located (QCL-TypeD) for each resource.

When the UE estimates a channel using one or more VZP CSI-RS resources for one CSI reporting and measures interference using one or more CSI-VIMs, it may be assumed that the VZP CSI-RS and the CSI-VIM are type D quasi-co-located (QCL-TypeD) for each resource. When the UE measures interference using the NZP CSI-RS, it may be assumed that the NZP CSI-RS measuring the channel and the CSI-IM and NZP CSI-RS measuring the interference are quasi-co-located as QCL-TypeD. When the UE measures interference using the VZP CSI-RS, it may be assumed that the VZP CSI-RS measuring the channel and the CSI-VIM and VZP CSI-RS measuring the interference are quasi-co-located as QCL-TypeD.

According to another embodiment of the disclosure, the CSI-ResourceConfig includes S-numbered CSI resource set lists, and each list includes at least one piece of NZP CSI-RS set, SS/PBCH set, CSI-IM resource set, VZP CSI-RS set, and CSI-VIM resource set information. From each CSI resource setting, the NZP CSI-RS set, SS/PBCH set, and CSI-IM resource set are configured for one DL BWP, the VZP CSI-RS set and CSI-VIM resource set are configured for resources excluding the configured DL BWP, and the report setting corresponding to the resource setting may also be configured for the DL BWP and for other than the DL BWP. The CSI resource setting may include at least one or more pieces of the following information for channel or interference measurement.

CSI-IM resource: for interference measurement of DL BWP
NZP CSI-RS resource for interference measurement: for interference measurement of DL BWP
NZP CSI-RS resource for channel measurement: for channel measurement of DL BWP
VZP CSI-RS resource for channel measurement: for channel measurement other than DL BWP
CSI-VIM resource: for interference measurement other than DL BWP
VZP CSI-RS resource for interference measurement: for interference measurement other than DL BWP When the UE estimates a channel using one or more NZP CSI-RS resources for one CSI reporting and measures interference using one or more CSI-IMs, it may be assumed that the NZP CSI-RS and the CSI-IM are type D quasi-co-located (QCL-TypeD) for each resource. When the UE estimates a channel using one or more VZP CSI-RS resources for one CSI reporting and measures interference using one or more CSI-VIMs, it may be assumed that the VZP CSI-RS and the CSI-VIM are type D quasi-co-located (QCL-TypeD) for each resource. When the UE measures interference using the NZP CSI-RS, it may be assumed that the NZP CSI-RS measuring the channel and the CSI-IM and NZP CSI-RS measuring the interference are quasi-co-located as QCL-TypeD. When the UE measures interference using the VZP CSI-RS, it may be assumed that the VZP CSI-RS measuring the channel and the CSI-VIM and VZP CSI-RS measuring the interference are quasi-co-located as QCL-TypeD.

According to another embodiment of the disclosure, the CSI-ResourceConfig includes S-numbered CSI resource set lists, and each list includes at least one piece of NZP CSI-RS set, SS/PBCH set, CSI-IM resource set, VZP CSI-RS set, and CSI-VIM resource set information. From each CSI resource setting, the NZP CSI-RS set, the SS/PBCH set, the CSI-IM resource set, the VZP CSI-RS set, and the CSI-VIM resource set are configured for one DL BWP, and the report setting corresponding to the resource setting may be configured for the DL BWP. The CSI resource setting may include at least one or more pieces of the following information for channel or interference measurement.

- CSI-IM resource: for interference measurement of DL BWP
- NZP CSI-RS resource for interference measurement: for interference measurement of DL BWP
- NZP CSI-RS resource for channel measurement: for channel measurement of DL BWP
- VZP CSI-RS resource for channel measurement: for channel measurement of DL BWP
- CSI-VIM resource: for interference measurement of DL BWP
- VZP CSI-RS resource for interference measurement: for interference measurement of DL BWP When the UE estimates a channel using one or more NZP CSI-RS resources for one CSI reporting and measures interference using one or more CSI-IMs, it may be assumed that the NZP CSI-RS and the CSI-IM are type D quasi-co-located (QCL-TypeD) for each resource.

When the UE estimates a channel using one or more VZP CSI-RS resources in one CSI reporting and measures interference using one or more CSI-VIMs, it may be assumed that the VZP CSI-RS and the CSI-VIM are type D quasi-co-located (QCL-TypeD) for each resource. When the UE measures interference using the NZP CSI-RS, it may be assumed that the NZP CSI-RS measuring the channel and the CSI-IM and NZP CSI-RS measuring the interference are quasi-co-located as QCL-TypeD. When the UE measures interference using the VZP CSI-RS, it may be assumed that the VZP CSI-RS measuring the channel and the CSI-VIM and VZP CSI-RS measuring the interference are quasi-co-located as QCL-TypeD.

Report Configurations

Dependency between CSI parameters is as follows.
LI is calculated based on reported CQI, PMI, IR, and CRI
CQI is calculated based on reported PMI, RI, and CRI.
PMI is calculated based on reported RI and CRI.
RI is calculated based on reported CRI.

The relationship between the CSI-RS configuration and the CSI reporting configuration is shown in Table 6 below.

TABLE 6

| CSI-RS configuration | Periodic CSI reporting | Semi-persistent CSI reporting | Aperiodic CSI reporting |
| --- | --- | --- | --- |
| Periodic CSI-RS | RRC triggering | MAC CE on PUCCH, Dynamic DCI on PUSCH | Dynamic DCI, MAC CE |
| Semi-persistent CSI-RS | x | MAC CE on PUCCH, Dynamic DCI on PUSCH | Dynamic DCI, MAC CE |
| Aperiodic CSI-RS | x | x | Dynamic DCI, MAC CE |

The UE may be configured with a subband size according to a BWP size for CSI reporting, and based on this, may determine the resolution of CQI and PMI. When reporting subband PMI or CQI, wideband PMI or CQI may be fed back, and the subband PMI or CQI may be further fed back.

When reporting on different BWPs according to an embodiment of the disclosure, dependency between CSI parameters is as follows.

The dependency between the CSI parameters related to the NZP CSI-RS or CSI-IM transmitted to the first DL BWP is as follows.
- LI is calculated based on reported CQI, PMI, IR, and CRI based on NZP CSI-RS or CSI-IM.
- CQI is calculated based on reported PMI, RI, and CRI based on NZP CSI-RS or CSI-IM.
- PMI is calculated based on reported RI and CRI based on NZP CSI-RS or CSI-IM.
- RI is calculated based on reported CRI based on NZP CSI-RS or CSI-IM.

The dependency between the CSI parameters related to the VZP CSI-RS or CSI-VIM transmitted to the second DL BWP is as follows.
- LI is calculated based on reported CQI, PMI, IR, and CRI based on VZP CSI-RS or CSI-VIM.
- CQI is calculated based on reported PMI, RI, and CRI based on VZP CSI-RS or CSI-VIM.
- PMI is calculated based on reported RI and CRI based on VZP CSI-RS or CSI-VIM.
- RI is calculated based on reported CRI based on VZP CSI-RS or CSI-VIM.

The relationship between the CSI-RS configuration and the CSI reporting configuration is shown in Table 7 below.

TABLE 7

| CSI-RS configuration | Periodic CSI reporting | Semi-persistent CSI reporting | Aperiodic CSI reporting |
| --- | --- | --- | --- |
| Periodic CSI-RS | RRC triggering | MAC CE on PUCCH, Dynamic DCI on PUSCH | Dynamic DCI, MAC CE |
| Semi-persistent CSI-RS | x | MAC CE on PUCCH, Dynamic DCI on PUSCH | Dynamic DCI, MAC CE |
| Aperiodic CSI-RS | x | x | Dynamic DCI, MAC CE |

The UE may be configured with a subband size according to the BWP size for CSI reporting, and based on this, may determine the resolution of CQI and PMI. When reporting subband PMI or CQI, wideband PMI or CQI may be fed back, and the subband PMI or CQI may be further fed back. The triggering method of Table 7 includes a method of separately configuring triggering for the first DL BWP and triggering for the second DL BWP and a method of triggering them at the same time. Here, the reporting period for the first DL BWP is configured to be shorter than the reporting period for the second DL BWP.

When reporting on other than the DL BWP according to another embodiment of the disclosure, dependency between the CSI parameters is as follows.

The dependency between the CSI parameters through the NZP CSI-RS or CSI-IM transmitted to the first DL BWP is as follows.

LI is calculated based on reported CQI, PMI, IR, and CRI based on NZP CSI-RS or CSI-IM.

CQI is calculated based on reported PMI, RI, and CRI based on NZP CSI-RS or CSI-IM.

PMI is calculated based on reported RI and CRI based on NZP CSI-RS or CSI-IM.

RI is calculated based on reported CRI based on NZP CSI-RS or CSI-IM.

Dependency between the CSI parameters through the VZP CSI-RS and CSI-VIM transmitted to the second DL BWP is as follows.

LI is calculated based on reported CQI, PMI, IR, and CRI based on VZP CSI-RS or CSI-VIM.

CQI is calculated based on reported PMI, RI, and CRI based on VZP CSI-RS or CSI-VIM.

PMI is calculated based on reported RI and CRI based on VZP CSI-RS or CSI-VIM.

RI is calculated based on reported CRI based on VZP CSI-RS or CSI-VIM.

The relationship between the CSI-RS configuration and the CSI reporting configuration is shown in Table 8 below.

TABLE 8

| CSI-RS configuration | Periodic CSI reporting | Semi-persistent CSI reporting | Aperiodic CSI reporting |
| --- | --- | --- | --- |
| Periodic CSI-RS | RRC triggering | MAC CE on PUCCH, Dynamic DCI on PUSCH | Dynamic DCI, MAC CE |
| Semi-persistent CSI-RS | x | MAC CE on PUCCH, Dynamic DCI on PUSCH | Dynamic DCI, MAC CE |
| Aperiodic CSI-RS | x | x | Dynamic DCI, MAC CE |

The UE may be configured with a subband size according to the BWP size for CSI reporting, and based on this, may determine the resolution of CQI and PMI. When reporting subband PMI or CQI, wideband PMI or CQI may be fed back, and subband PMI or CQI may be further fed back. The trigger method of Table 8 includes a method of separately configuring triggering for the first DL BWP and triggering for the second DL BWP, and a method of simultaneously triggering for the first and second BWPs. Here, the reporting period for the first DL BWP may be configured to be shorter than that for the second DL BWP.

Figure 9:
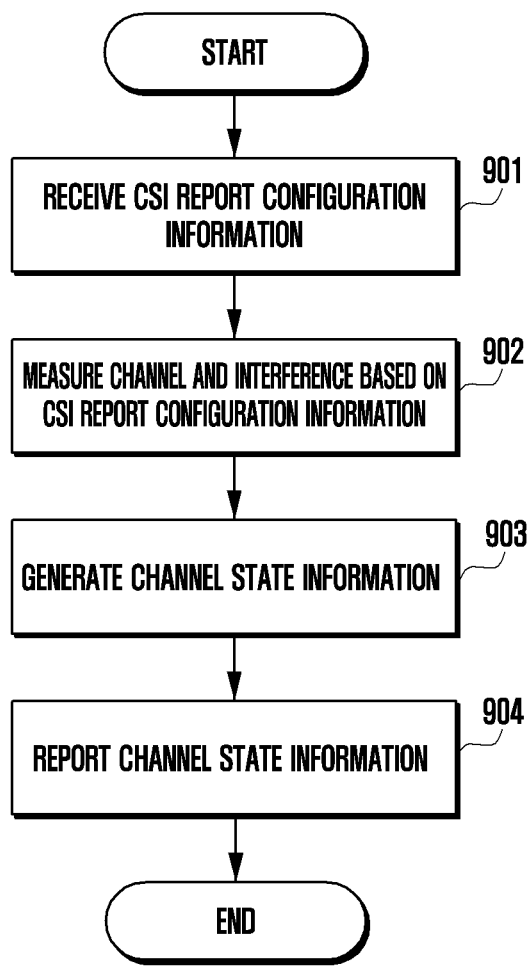
FIG. 9 is a flowchart illustrating an operation of a UE according to an embodiment of the disclosure.

FIG. 9 is a flowchart illustrating an operation of a UE according to an embodiment of the disclosure.

Referring to FIG. 9, in operation 901, a UE may receive configuration information for CSI report from a base station. The configuration information for the CSI report may include at least one piece of report setting, resource setting, and list of triggering state information.

In operation 902, the UE may measure a channel or interference based on the received configuration information for the CSI report. According to an embodiment of the disclosure, the UE uses NZP CSI-RS resource, CSI-IM resource, VZP CSI-RS resource, and CSI-VIM resource included in the configuration information to measure a channel or interference for the entire frequency band including a frequency band in which the CSI-RS is not transmitted according to the above-described embodiment. According to an embodiment of the disclosure, the UE may measure the channel or interference of a first DL BWP band using the NZP CSI-RS resource and the CSI-IM resource, and may measure the channel or interference of a second DL BWP using the VZP CSI-RS resource and the CSI-VIM resource. According to another embodiment of the disclosure, the UE may measure a channel or interference in a DL BWP band using the NZP CSI-RS resource and the CSI-IM resource, and may measure a channel or interference in a band other than the DL BWP band using the VZP CSI-RS resource and the CSI-VIM resource.

In operation 903, the UE may generate channel state information for CSI report based on the measurement result. In this case, dependency between CSI parameters through NZP CSI-RS, CSI-IM, VZP CSI-RS and CSI-VIM according to an embodiment of the disclosure is as described above.

In operation 904, the UE may report the measured channel state information to the base station.

Figure 10:
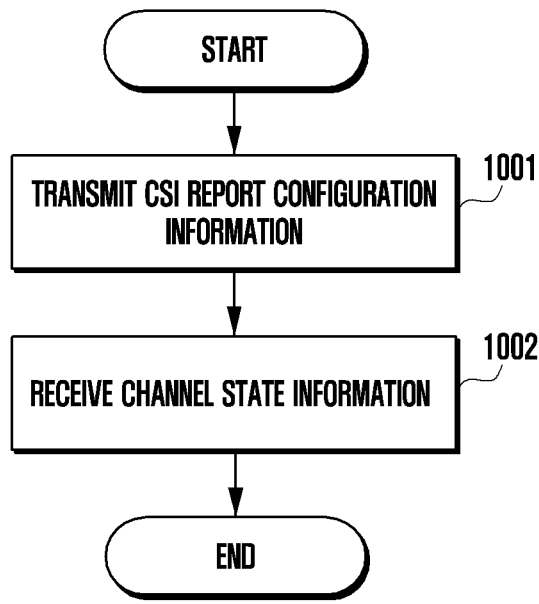
FIG. 10 is a flowchart illustrating an operation of a base station according to an embodiment of the disclosure.

FIG. 10 is a flowchart illustrating an operation of a base station according to an embodiment of the disclosure.

Referring to FIG. 10, in operation 1001, a base station may transmit configuration information for CSI report to a UE. The configuration information for CSI report may include at least one piece of report setting, resource setting, and list of triggering state information.

In operation 1002, the UE that has received the configuration information for CSI report may generate channel state information by performing channel measurement according to the above-described embodiment of the disclosure, and the base station may receive a channel state information report from the UE.

Figure 11:
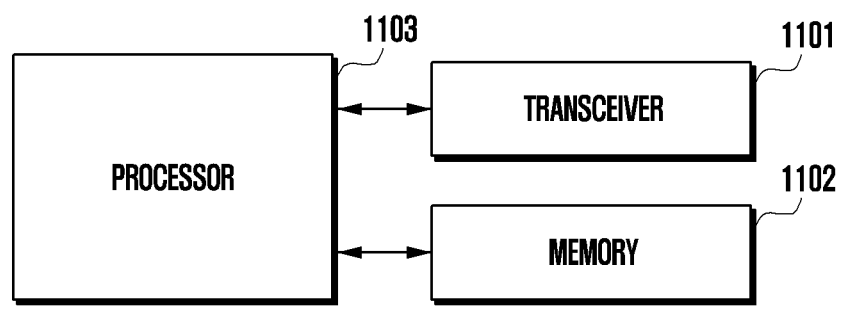
FIG. 11 is a block diagram illustrating a structure of a UE according to an embodiment of the disclosure.
Figure 12:
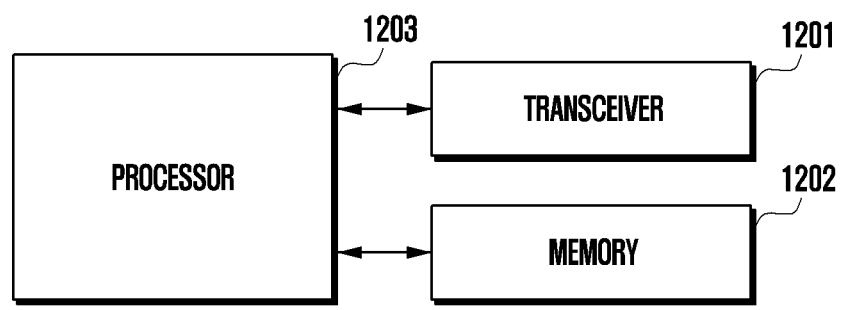
FIG. 12 is a block diagram illustrating a structure of a base station according to an embodiment of the disclosure.

In order to perform the above-described embodiments of the disclosure, the transceiver, the memory, and the processor of each of the UE and the base station are shown in FIGS. 11 and 12, respectively.

FIG. 11 is a block diagram illustrating a structure of a UE according to an embodiment of the disclosure.

Referring to FIG. 11, a UE may include a transceiver 1101, a memory 1102, and a processor 1103. However, the components of the UE are not limited to the above-described examples. For example, the UE may include more or fewer components than the above-described components. In addition, the transceiver 1101, the memory 1102, and the processor 1103 may be implemented in the form of a single chip.

According to an embodiment of the disclosure, the transceiver 1101 may transmit and receive signals to and from the base station. The above-described signal may include control information and data. To this end, the transceiver 1101 may include an RF transmitter that up-converts and amplifies the frequency of a transmitted signal, and an RF receiver that amplifies a received signal with low noise and down-converts a frequency. In addition, the transceiver 1101 may receive a signal through a wireless channel, may output the received signal to the processor 1103, and may transmit the signal output from the processor 1103 through the wireless channel.

According to an embodiment of the disclosure, the memory 1102 may store programs and data necessary for the operation of the UE. In addition, the memory 1102 may store control information or data included in signals transmitted and received by the UE. The memory 1102 may be composed of a storage medium, such as a read only memory (ROM), a random access memory (RAM), a hard disk, a compact disc (CD)-ROM, or a digital versatile discs (DVD), or a combination of the storage media. In addition, the memory 1102 may be composed of a plurality of memories. According to an embodiment of the disclosure, the memory 1102 may store a program for controlling and receiving an operation for reducing power consumption of a UE.

According to an embodiment of the disclosure, the processor 1103 may control a series of processes in which the UE can operate according to the above-described embodiments of the disclosure.

FIG. 12 is a block diagram illustrating a structure of a base station according to an embodiment of the disclosure.

Referring to FIG. 12, a base station may include a transceiver 1201, a memory 1202, and a processor 1203. However, the components of the base station are not limited to the above-described examples. For example, the base station may include more or fewer components than the above-described components. In addition, the transceiver 1201, the memory 1202, and the processor 1203 may be implemented in the form of a single chip.

According to an embodiment of the disclosure, the transceiver 1201 may transmit and receive signals to and from a UE. The above-described signal may include control information and data. To this end, the transceiver 1201 may include an RF transmitter that up-converts and amplifies the frequency of a transmitted signal, and an RF receiver that amplifies a received signal with low noise and down-converts a frequency. In addition, the transceiver 1201 may receive a signal through a wireless channel, may output the received signal to the processor 1203, and may transmit the signal output from the processor 1203 through the wireless channel.

According to an embodiment of the disclosure, the memory 1202 may store programs and data required for the operation of the base station. In addition, the memory 1202 may store control information or data included in signals transmitted and received by the base station. The memory 1202 may be composed of a storage medium, such as a ROM, a RAM, a hard disk, a CD-ROM, or a DVD, or a combination of the storage media. In addition, the memory 1202 may be composed of a plurality of memories. According to an embodiment of the disclosure, the memory 1202 may store a program for generating and transmitting control information for reducing power consumption of the UE of the base station.

According to an embodiment of the disclosure, the processor 1203 may control a series of processes so that the base station can operate according to the embodiment of the disclosure described above.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a ROM, an electrically erasable programmable read only memory (EEPROM), a magnetic disc storage device, a compact disc-ROM (CD-ROM), DVDs, or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks, such as the Internet, Intranet, local area network (LAN), wide LAN (WLAN), and storage area network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

While the disclosure has been shown and described with reference to various embodiments thereof, it will be understood by those skilled in the art that various changes in form and details may be made therein based on without departing from the spirit and scope of the disclosure as defined by the appended claims and their equivalents. Further, the above respective embodiments may be employed in combination, as necessary. For example, one embodiment of the disclosure may be partially combined with another embodiment to operate a base station and a terminal. Further, embodiments of the disclosure may be applied to other communication systems, and other variants may also be implemented based on the technical idea of the embodiments of the disclosure, For example, the embodiments may be applied to LTE, 5G, or NR systems.

What is claimed is:

1. A method performed by a terminal in a communication system, the method comprising:
   receiving, from a base station, information on a first channel state information (CSI) resource corresponding to a first frequency band and information on a second CSI resource corresponding to a second frequency band, wherein at least part of the second frequency band is different from the first frequency band;
   receiving, from the base station, a CSI related signal on the first CSI resource corresponding to the first frequency band;
   identifying the first CSI resource corresponding to the first frequency band in which the CSI related signal is received, and second CSI resource corresponding to the second frequency band in which the CSI related signal is not received;
   obtaining CSI for the second frequency band based on the first CSI resource and the second CSI resource; and
   transmitting, to the base station, the CSI for the second frequency band,
   wherein the CSI related signal is transmitted on a plurality of symbols, and
   wherein the CSI for the second frequency band is obtained in case that a number of non-zero elements of a channel impulse response (CIR) of the CSI related signal received on at least part of the plurality of symbols is less than a predetermined value.

2. The method of claim 1, wherein the CSI related signal is not received on the second CSI resource corresponding to the second frequency band.

3. The method of claim 1, wherein the CSI for the second frequency band is obtained based on a channel impulse response (CIR) of the CSI related signal.

4. A method performed by a base station in a communication system, the method comprising:
transmitting, to a terminal, information on a first channel state information (CSI) resource corresponding to a first frequency band and information on a second CSI resource corresponding to a second frequency band, wherein at least part of the second frequency band is different from the first frequency band;
transmitting, to the terminal, a CSI related signal on the first CSI resource corresponding to the first frequency band; and
receiving, from the terminal, CSI for the second frequency band,
wherein the CSI for the second frequency band is obtained based on the CSI related signal transmitted on the first CSI resource, and
wherein the CSI for the second frequency band is based on the first CSI resource corresponding to the first frequency band in which the CSI related signal is transmitted, and the second CSI resource corresponding to the second frequency band in which the CSI related signal is not transmitted,
wherein the CSI related signal is transmitted on a plurality of symbols, and
wherein the CSI for the second frequency band is obtained in case that a number of non-zero elements of a channel impulse response (CIR) of the CSI related signal transmitted on at least part of the plurality of symbols is less than a predetermined value.

5. The method of claim 4, wherein the CSI related signal is not transmitted on the second CSI resource corresponding to the second frequency band.

6. The method of claim 4, wherein the CSI for the second frequency band is obtained based on a channel impulse response (CIR) of the CSI related signal.

7. A terminal in a communication system, the terminal comprising:
a transceiver; and
at least one processor configured to:
receive, from a base station, information on a first channel state information (CSI) resource corresponding to a first frequency band and information on a second CSI resource corresponding to a second frequency band, wherein at least part of the second frequency band is different from the first frequency band,
receive, from the base station, a CSI related signal on the first CSI resource corresponding to the first frequency band,
identify the first CSI resource corresponding to the first frequency band in which the CSI related signal is received, and second CSI resource corresponding to the second frequency band in which the CSI related signal is not received,
obtain CSI for the second frequency band based on the first CSI resource and the second CSI resource, and
transmit, to the base station, the CSI for the second frequency band,
wherein the CSI related signal is transmitted on a plurality of symbols, and
wherein the CSI for the second frequency band is obtained in case that a number of non-zero elements of a channel impulse response (CIR) of the CSI related signal received on at least part of the plurality of symbols is less than a predetermined value.

8. The terminal of claim 7, wherein the CSI related signal is not received on the second CSI resource corresponding to the second frequency band.

9. The terminal of claim 7, wherein the CSI for the second frequency band is obtained based on a channel impulse response (CIR) of the CSI related signal.

10. A base station in a communication system, the base station comprising:
a transceiver; and
at least one processor configured to:
transmit, to a terminal, information on a first channel state information (CSI) resource corresponding to a first frequency band and information on a second CSI resource corresponding to a second frequency band, wherein at least part of the second frequency band is different from the first frequency band,
transmit, to the terminal, a CSI related signal on the first CSI resource corresponding to the first frequency band, and
receive, from the terminal, CSI for the second frequency band,
wherein the CSI for the second frequency band is obtained based on the CSI related signal transmitted on the first CSI resource, and
wherein the CSI for the second frequency band is based on the first CSI resource corresponding to the first frequency band in which the CSI related signal is transmitted, and the second CSI resource corresponding to the second frequency band in which the CSI related signal is not transmitted,
wherein the CSI related signal is transmitted on a plurality of symbols, and
wherein the CSI for the second frequency band is obtained in case that a number of non-zero elements of a channel impulse response (CIR) of the CSI related signal transmitted on at least part of the plurality of symbols is less than a predetermined value.

11. The base station of claim 10, wherein the CSI related signal is not transmitted on the second CSI resource corresponding to the second frequency band.

12. The base station of claim 10, wherein the CSI for the second frequency band is obtained based on a channel impulse response (CIR) of the CSI related signal.

* * * * *